United States Patent [19]

Grady et al.

[11] Patent Number: 5,276,776

[45] Date of Patent: Jan. 4, 1994

[54] SYSTEM AND METHOD FOR BUILDING A COMPUTER-BASED RETE PATTERN MATCHING NETWORK

[75] Inventors: Charles R. Grady, Gaithersburg; Frederic D. Highland, New Midway; Christine T. Iwaskiw, Ellicott City; Michael Pfeifer, Bethesda, all of Md.

[73] Assignee: International Business Machines Corporation, Armonk, N.Y.

[21] Appl. No.: 919,699

[22] Filed: Jul. 27, 1992

Related U.S. Application Data

[62] Division of Ser. No. 515,843, Apr. 27, 1990, Pat. No. 5,159,662.

[51] Int. Cl.$^5$ .................. G06F 15/46; G06F 15/18
[52] U.S. Cl. .................................. 395/64; 395/51
[58] Field of Search ....................... 395/61, 64, 51

[56] References Cited

U.S. PATENT DOCUMENTS

| | | | |
|---|---|---|---|
| 4,761,746 | 8/1988 | Tano et al. | 395/64 |
| 4,849,905 | 7/1989 | Loeb et al. | 395/64 |
| 4,882,691 | 11/1989 | Schor | 395/64 |
| 4,890,240 | 12/1989 | Loeb et al. | 395/51 |
| 4,924,408 | 5/1990 | Highland | 395/64 |
| 4,928,236 | 5/1990 | Tanak et al. | 395/51 |
| 4,951,225 | 8/1990 | Lee et al. | 395/64 |
| 4,956,791 | 9/1990 | Lee et al. | 395/51 |
| 4,965,882 | 10/1990 | Barabash et al. | 395/50 |
| 5,023,807 | 6/1991 | Ramakrishna et al. | 395/64 |
| 5,072,405 | 12/1991 | Ramakrishna et al. | 395/64 |
| 5,129,037 | 7/1992 | Kirk et al. | 395/64 |
| 5,155,803 | 10/1992 | Barabash et al. | 395/64 |

OTHER PUBLICATIONS

Lee et al, "Dynamic Augmentation of Generalized Rete Networks for Demand-Driven Matching and Rule Updating", The 6th Conf. of A.I. Applications 1990 IEEE.

Gupta et al, "Parallel OPS5 on the Encore Multimax", Processings of the 1988 Int. Conf. on parallel processing pp. 271-280 vol. 1.

Forgy et al., "Preliminary Architecture of the CMU Production System Machine" proceedings of the 19th Annual Hawaii Int. Conf. on system sciences, 1986.

Miranker et al, "TREAT; A Better Match Algorithm for AI Production Systems", AAAI, Jul. 1987.

A paper entitled *Advances In Rete Pattern Matching*, Marshall I. Schor, Timothy P. Daly, Ho Soo Lee, Beth R. Tibbitts, pp. 226–232, of the Journal *Science*, issue entitled *Uncertainty and Expert Systems: Automated Reasoning*.

A paper entitled, *Rete: A Fast Algorithm for the Many Pattern/Many Object Pattern Match Problem*, Charles L. Forgy, pp. 17–37, of the Journal *Artificial Intelligence* 19 (1982) 17–37.

*Measurements on Production Systems*, Anoop Gupta and Charles L. Forgy (Department of Computer Science-Carnegie-Mellon University), Dec. 1983, pp. 1–30.

An article entitled *Rete: A*, Charles L. Forgy and Susan J. Shepard, pp. 34–40, of the Journal *AI Expert*, Jan. 1987.

*Primary Examiner*—Allen R. MacDonald
*Assistant Examiner*—George Davis
*Attorney, Agent, or Firm*—Lauren C. Bruzzone

[57] ABSTRACT

A computer-based system and method for building a Rete based network. The computer-based system comprises a first module for inputting rules into the computer-based system, wherein each of the rules may have arbitrary specified tests therein. The computer-based system further comprises a second module responsive to the first module for generating a data structure indicative of each of the inputted rules. The computer-based system further comprises a third module, responsive to the second module, for storing each of the inputted rules and a fourth module responsive to said third means for constructing a Rete network for the rules. Further disclosed is system and method for allowing an expert system developer to enter rules that are formatted in conjunctive, disjunctive and or negated form.

10 Claims, 36 Drawing Sheets

SYSTEM AND METHOD FOR BUILDING A COMPUTER-BASED RETE PATTERN MATCHING NETWORK

This application is a division of application Ser. No. 07/515,843, filed Apr. 27, 1990, now U.S. Pat. No. 5,159,662.

BACKGROUND OF THE INVENTION

1. Field of the Invention

The present invention relates generally to a system and method for building a knowledge base for use in a knowledge based or expert computer system. More specifically, the present invention relates to a system and method for building a Rete pattern matching network of rules for use in a knowledge based computer system.

2. Related Art

Knowledge bases for expert systems operating on computers are typically composed of rules. These rules are commonly expressed in the form of IF-THEN statements. The IF portion of the rule represents a collection of conditions (tests against objects in the system) forming patterns.

The matching of a large collection of patterns to a large collection of objects is one operation of an inference engine. An inference engine is the reasoning component in artificial intelligence and expert systems. Inference engines typically contain three components or methods: (1) matching a collection of objects to a given rule, (2) selecting a rule from a list of rules whose conditions are completely matched by objects, and (3) firing of the selected rule.

The most time consuming phase in an inference engine is the matching process. For example, consider a system and method with a 1000 objects and a 1000 rules, where each rule has three conditions. In a very simple implementation scheme, each rule is compared against all objects. This leads to over a trillion match operations for each execution cycle.

The Rete pattern matching algorithm is a complex algorithm that can achieve the result of this example with only a small fraction of the work (that is, much fewer than a trillion match operations). The Rete pattern matching algorithm is described in C. L. Forgy, "RETE: A FAST ALGORITHM FOR THE MANY PATTERN/MANY OBJECT PATTERN MATCH PROBLEM, " *Artificial Intelligence,* Vol. 19, pp. 171-37 (1982); and C. L. Forgy, *MEASUREMENTS ON PRODUCTION SYSTEMS,* Department of Computer Science, Carnegie-Mellon University, Pittsburgh, Pa. (1983). These references are hereby incorporated by reference, in their entirety, into this specification. Note that the Rete pattern matching algorithm will be described only to the extent necessary for an understanding of the problem(s) solved by the present invention.

The Rete pattern matching algorithm implements a "divide and conquer" strategy to the matching component or method. The conditions that make up a given rule are tested. Failure of one condition prevents testing of subsequent Conditions. To perform the matching the Rete pattern matching algorithm uses an augmented discrimination network (referred herein as a Rete network) compiled from the premise of the rule. Each object is first tested against conditions that involve only that object. Objects which pass these tests are then joined with other objects to perform tests requiring multiple objects. Collections of objects which pass all tests become candidates for selection and firing.

The Rete network comprises a network of connected nodes. These nodes comprise either a root node(s), alpha node(s), beta node(s), and node(s), beta—not node(s), and—not node(s), terminal node(s) and, gamma node(s). There is one root node for every object type.

Root nodes represent the entry points for objects to be tested. Root nodes broadcast the objects to the successor nodes in the network based on their object type.

Alpha nodes represent intra-element tests. Intra-element tests perform tests against a single object. Intra-element tests may relate to whether the attributes of an object have a constant value as specified in the rule. Intra-element tests may also relate to whether the attributes of an object are related to a constant by a predicate. Intra-element tests may further relate to whether two attributes of the same object match under a specified relation. These tests may be performed on variables which are negatively quantified in the rule premise. These tests may also be performed on variables which are positively quantified. That is, they may be used to verify the non-existence of a variable as well as the existence of a variable.

Beta nodes and beta—not nodes represent inter-element tests. Unlike intra-element tests, inter-element tests examine attributes of multiple data objects. These tests determine whether there is some relationship between two or more data objects. Beta nodes are used to test sets of data objects which are either (1) purely negatively quantified, or (2) purely positively quantified. Tests involving a combination of positively quantified and negatively quantified variables are referred to a mixed quantification tests. These are implemented in the Rete network by beta—not nodes. Gamma nodes are a variation of beta nodes. Like beta nodes, these nodes perform inter-element tests. However, unlike beta nodes, these nodes receive all of their input from one source: beta nodes have a left input and a right input, while gamma nodes only have a left input.

All inter-element tests require that several data objects be brought together so that they are available for testing at one point. Since beta nodes have two inputs, they help to combine objects. Sometimes, however, all of the objects are already available at one point (perhaps a prior beta node, for example). If this one point can serve as an input for the inter-element test, the second input is superfluous. Thus, some conventional systems distinguish between gamma and beta nodes to accommodate this variant case.

AND nodes are used to create combinations of objects for later testing by subsequent nodes. These nodes perform no testing. They merely facilitate the merging of data objects. And—not nodes are a variant example of an AND node. These join together the results of positively quantified variable tests with results of negatively quantified variable tests. When taken in conjunction with the alpha, beta, and gamma tests described above, the and—not node implements the semantics of non-existence testing.

Terminal nodes represent the bottom of the Rete network for a given rule. Each rule has only one terminal node.

To avoid performing the same tests repeatedly, the Rete network employs memory nodes. Memory nodes store the result of a match with an object as a state within the network. These nodes are termed alpha memory nodes and beta memory nodes. To implement the memory nodes, the objects that are passed between nodes in the network are called "tokens", which comprise a tag and a list of objects. The tag can be either a +, indicating that something has been added to the knowledge base, or a −, indicating that something has been removed from the knowledge base. The list of objects associated with a token corresponds to the permutation of those objects that the system is trying to match or has already matched against a subsequence of objects in the rule premise.

In operation, whenever the token arriving at the input of an alpha node satisfies the associated test, it is passed on to the successors of the alpha node. If the token does not satisfy the test, it is not passed on to the successors. If an object satisfies all intra-element tests (note it may not, as yet, satisfy all the inter-element tests), the object is said to partially match a rule. Tokens corresponding to objects that partially match a condition in the rule premise are stored in the alpha memory node. If two objects, in the same or different rules, have exactly the same tests for a successful partial match, the network shares alpha memory node for the two.

When a token is distributed to the left input of a beta node, the beta node compares the incoming token to each token stored in the alpha memory node associated with its right ancestor alpha node. For every right-token which is consistent with the left-token, a new token is constructed and stored in the successor beta memory node. The token is then passed to the successor nodes. The new token has the same tag as that of the left-token, and the list of objects is the compilation of objects for the left and right tokens.

Whenever a token with a +tag flows into a terminal node, it adds an instantiation (corresponding to the token) of the associated rule into the conflict set. The arrival of a token with a −tag leads to the deletion of the corresponding rule instantiation from the conflict set.

As should be appreciated, only changes made to the knowledge base by the most recent rule firing have to be processed every cycle. These changes "filter" through the network, and where relevant, the state stored in the network is updated. This is a significant attribute of the Rete pattern matching algorithm. The output of the network comprises a specification of bound variables, (bindings, matched objects) to the conflict set.

The Rete network was first implemented using an OPS5 (computer language) based computer system. The OPS5 system is described in C. L. Forgy, *OPS5 USERS MANUAL*, Department of Computer Science, Carnegie-Mellon University (1981). This reference is hereby incorporated by reference, in its entirety, into this specification.

In an OPS5 based computer system, a user must format the left hand side (LHS), or premise, of a rule in conjunctive form. In other words, the Rete network can only process rules that are expressed in conjunctive form. A typical OPS5 rule named p1 is expressed using the following syntax:

```
(p p1   (C1  ↑attr1 <x>  ↑attr2 12)
        (C2  ↑attr1 15   ↑attr2 <x>)
        (C3  ↑attr1 <x>)

(remove 2))
```

Rule p1 has three conditions in its LHS. These conditions are identified by the sets of closed parentheses.

The first condition (the first line of the rule) has three separate tests. The first test corresponds to whether an object is of the type C1. The second test corresponds to whether an object of the type C1 has an attribute ↑attr1 and some value <x>. Any value will match the variable x. (Note that the implications of specifying a value with a variable is discussed below.) The third test corresponds to whether an object of the type C1 has the attribute ↑attr2 with a value equal to 12.

The second condition (the second line of the rule) also has three separate tests. The first test corresponds to whether an object is of the type C2. The second test corresponds to whether an object of the type C2 has the attribute ↑attr1 with a value equal to 15. The third test corresponds to whether an object of the type C2 has the attribute ↑attr2 with a value <x>.

The third condition (the third line of the rule) has only two separate tests. Note that the condition is negated (see the −). The first test corresponds to whether an object is of the type C3. The second test corresponds to whether an object of the type C3 has the attribute ↑attr1 and a value <x>.

Rule p1 is fired if there is an object in the computer based system and method that satisfies the first condition and there is an object that satisfies the second condition and there is an object in that satisfies the third condition. Note that this and relationship between the three example conditions denotes a conjunctive relationship.

It should be noted that in rule 1, the variable x is specified in one test for each condition: ↑attr1 of object type C1 in the first condition; ↑attr2 of object type C2 in the second condition; and, ↑attr1 of object type C3 in the third condition. The consequence of the common specification of variable x is that for the rule to fire, the architecture of an OPS5 language computer system requires that objects C1, C2, and C3 and their corresponding attributes (↑attr1, ↑attr2, ↑attr1, respectively) have the same value. In an OPS5 based computer system, this is the only way to test whether the attributes of different objects are equal.

It should be understood that the Rete network building architecture of the OPS5 system does not allow the user to test in one condition whether the attributes of different objects are the same: the user must incorporate the test when the object type is first defined. As is discussed below, this limitation is a significant drawback.

It should also be understood that the user must specify all intra-element tests for a given object type when the object type is first defined. As is discussed below, the above constraint is likewise a significant disadvantage of the OPS5 Rete network building architecture.

The OPS5 system builds the Rete network by examining in sequence each condition of the rule looking for intra-element tests: a test against a single object. For each condition the network compiler chains together test nodes that check for intra-element tests of a specific object type (there may be several intra-element tests for a given condition, and thus for an object). The OPS5 system builds an alpha node for each of the intra-element tests in the exact order in which the user has written the rule.

Once the network compiler has finished with the intra-element tests, it re-examines each condition of the rule and adds nodes that check for inter-element tests. An OPS5 based system builds Beta nodes first. The Beta nodes are likewise built in the exact order as written by the user. The OPS5 system then builds beta_not nodes.

The beta—not nodes are also built in the exact order written by the user. In an OPS5 system, the right input of a beta node or a beta—not mode always comes from an alpha node, while its left input can come from an alpha node or a beta node.

The OPS5 compiler than adds a terminal node for each rule.

As may be apparent, the OPS5 system uses a "high control" architecture. The term "high control" means a system and method in which the user has complete control over the resultant Rete network structure. A high control system allows a user with a high degree of familiarity with the constraints of OPS5 to write the rules so that an optimal Rete network can be constructed. The more optimal the Rete Network, the faster the matching process. These users are sometimes referred to as "power users." A user less familiar with this high control architecture is likely to encounter significant problems when building an efficient Rete network.

As discussed previously, one significant problem with the OPS5 Rete network building architecture relates to its flexibility to process the specification of tests about an object within a rule premise. In an OPS5 system, the user must specify all tests that relate to a specific object (whether intra-element or inter-element tests) when the object type is first defined. The OPS5 architecture necessitates that all tests about an object be grouped in one condition. The OPS5 architecture is very inflexible.

The above constraint prevents a user from writing arbitrary tests about an object or inter-related tests about several objects. The OPS5 architecture dictates the way a user can think about and express a rule. This is a significant limitation of the OPS5 system.

Another em with the OPS5 architecture relates to the ability to use disjunctions. An OPS5 system does not recognize disjunctions (that is, OR related conditions): the Rete network is a conjunction process only. In other words, the Rete network is success oriented. Objects either pass or do not pass a given test. There is no middle ground for passing under certain cases but not others. The use of a disjunction implies the use of this "middle" ground. Hence, the Rete network cannot be regarded as intrinsically disjunctive. In OPS5, the user must build two separate rules. Specifically, the user must build one rule for each clause of the disjunction.

Another significant problem with the OPS5 architecture relates to the ability of the user to write a negated rule(s). An OPS5 system does not recognize a complex negated premise. A user is forced to write the rule in a positively framed statement.

Another problem with the OPS5 architecture relates to the requirement that to perform the action (RHS) part of a rule in a Rete based system, the objects referenced on the RHS must be bound to the LHS of the rule. In an OPS5 based system, the user must make sure that the object being acted on in the RHS of the rule is referenced in the LHS of the rule. Failure to meet this requirement may result in a system malfunction.

While the above describes the standard Rete network processing, other implementations and enhancements to Rete processing are possible. By way of example only, modifications to Rete network processing are described in M. I. Schor et al., *Advances In Rete Pattern Matching,* IBM T. J. Watson Research Center, Yorktown Heights, N.Y. (1986). This reference is hereby incorporated by reference in its entirety.

Another augmentation to the Rete pattern matching algorithm is the Treat Algorithm. The Treat algorithm is described in Miranker, Daniel P., "Treat: A Better Way for AI Production Systems," *Proceedings of Sixth National Conference on Artificial Intelligence,* Seattle, Wash., Jul 13-17, 1987, pp. 42-47. This reference is hereby incorporated by reference in its entirety. As described therein, the major difference is that the Treat algorithm does not save partial results in the network. This has the advantage of using less memory than is used by the Rete algorithm.

OBJECTS OF THE INVENTION

As is shown below, the present invention is equally applicable to a variety of augmentations of the Rete pattern matching algorithm.

One object of the present invention was to develop a Rete network building system and method that could process rules having arbitrary specified tests for objects.

Another object of the present invention was to develop a Rete network building system and method that could process rules which relate tests against objects by disjunctions.

Still another object of the present invention was to develop a Rete network building system and method that could process negated rules.

Yet another object of the present invention was to develop a Rete network building system and method that could process rules that have implicit conditions which are not specified in the rule premise.

These and other objects have been achieved by the system and method of the present invention.

SUMMARY OF THE INVENTION

The present invention provides advantages heretofore unavailable in conventional Rete network generating systems and methods. The present invention is a computer-based system and method that utilizes a novel approach in generating Rete networks, while maintaining Rete network system requirements and advantages. As will become appreciated by those skilled in the art, the present invention can be integrated with a variety of augmentations of the Rete network, and can be modified without departing from the essence of the present invention.

The present invention is expected to be used primarily in the context of computer-based artificial intelligence or expert system building tools. The present invention, however, can be integrated with a dedicated artificial intelligence or expert computer-based system.

In one embodiment, the system and method of the present invention can process rules which have arbitrary specified tests against objects. The user can write rules without concern for the ordering of objects (this concern is present in conventional Rete network generating systems and methods). At the same time, the system and method of the present invention allows the user, to a large extent, to control the topology of the Rete network.

The system and method of the present -invention accomplishes the above feature by: (1) allowing the relative ordering, as written by the user of inter-element tests (for example, beta, beta—not) to control the overall topology of the Rete network; (2) respecting the relative ordering of said inter-element tests; (3) respecting to the best extent possible the ordering of tests against an object attribute where another attribute of the object is not being referenced in a complex test; (4) allowing said intra-element tests to tune the performance of the Rete network inasmuch as their placement controls whether entire subsets of the Rete network will be enabled or disabled as a result of the success or failure of said tests; and/or (5) preserving the semantic meaning of negatively quantified tests.

In another embodiment, the system and method of the present invention can recognize and process rules expressed in disjunctive form (typically identified by an OR operator) because Rete networks are inherently conjunctive in nature (that is, they require conditions to be **ANDed together), the present invention modifies the rules internally to build a Rete network. To accomplish this, the present invention takes a rule premise with OR clauses, applies standard distributive laws of logic, and converts it to disjunctive normal form. This operation results in a set of conjunctive clauses that are ORed together. After conversion, the present invention operates on the conjunctive clauses to form a separate rule for each clause.

In another embodiment, the system and method of the present invention recognizes negated rules (typically identified by the NOT operator). Because Rete networks cannot handle arbitrary negation of rules, the system and method of the present invention, like in the case of disjunctive rules, modifies the rules internally to build the Rete network. The system and method of the present invention performs this conversion by applying De Morgan's law to negated clauses to convert them to positive clauses.

In another embodiment, the system and method of the present invention handles implicit conditions. The present invention examines every object in the right hand side (RHS) of a rule to ensure that they exist in the left hand side (LHS) of the rule. If an object exists in the RHS, but not in the LHS, it is a candidate to become an implicit condition. If the present invention determines t at the object is an implicit condition of the LHS, it adds the object to the Rete network.

BRIEF DESCRIPTION OF THE DRAWINGS

Various objects, features and attendant advantages of the present invention will be better understood from the following detailed description of the present invention. The detailed description makes reference to the accompanying drawings, in which:

FIG. 19 is made up of FIGS. 19A and 19B;

FIG. 26 shows the results of alpha node connection caused by reordering routine 1806;

FIG. 27 shows the results of first negative test processed by multi-input node module 1808 in step 1914;

FIG. 28 shows the results of the second test processed by the multi-input handler 1916;

FIGS. 29, 30, 31, 32 and 33 show the successive results of multi-input handler module 1916.

DETAILED DESCRIPTION OF THE PREFERRED EMBODIMENTS

Figure 1:
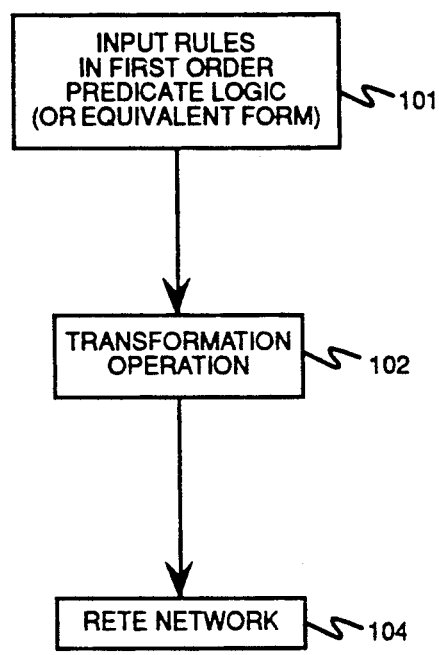
FIG. 1 is a high level block diagram showing the operation of the present invention.

The present invention is a system and method for building a Rete network. The system and method of the present invention provides advantages heretofore unavailable in conventional Rete network building systems and methods. The present invention can be integrated with computer-based expert system development shells and dedicated expert systems. FIG. 1 is a high level block diagram showing the operation of the present invention in general terms. As shown by an operational block 101, the present invention first allows a user to input rules in a syntax that is substantially functionally equivalent to First Order Predicate Logic or equivalent form. First Order Predicate Logic, for example, allows rules to be expressed in disjunctive, conjunctive or negated forms.

An operational block 102 shows the second operation of the present invention. Operational block 102 operates on (transforms) the rules to generate a data structure indicative of a Rete network. More particularly, operational block 102 operates to recognize and process rules that have arbitrary specified tests against objects. Operational block 102 further operates to recognize and process rules that have two or more tests against objects that have a disjunctive relation. Operational block 102 further operates t(Y recognize and process rules which have two or more tests against objects that have a conjunctive relation.

Figure 2:
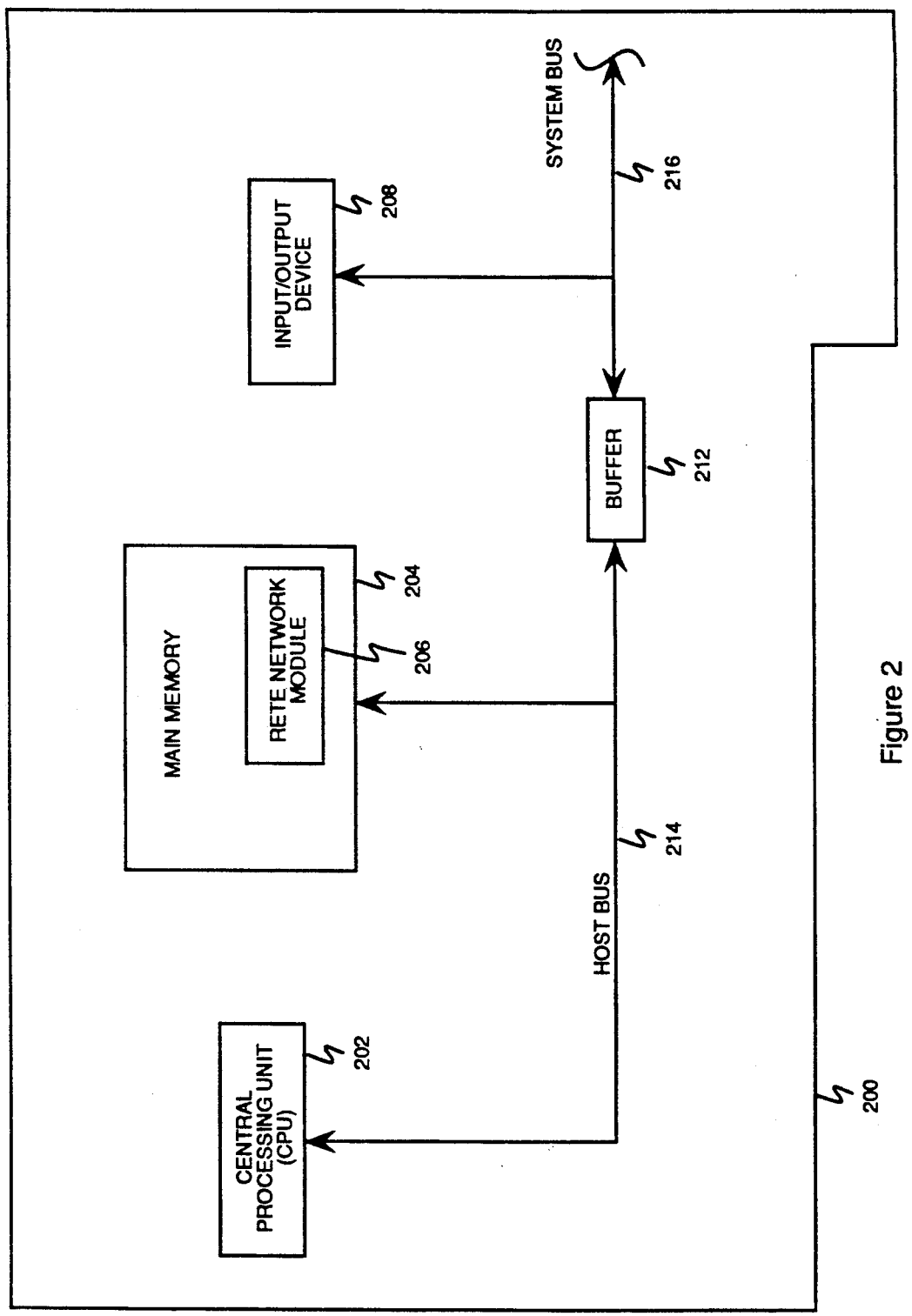
FIG. 2 is a high level block diagram showing the architectural environment 200 of present invention.

The structure corresponding to operational block 102 is a Rete network module 206 of the present invention (to be discussed first in connection with FIG. 2). As will become apparent, Rete network module 206 of the present invention allows the user to express rules in a more meaningful and understandable manner.

An operational block 104 shows the resultant data structure indicative of a Rete network.

Referring now to FIG. 2, a computer environment 200 of the Rete network module 206 of the present invention is shown. Computer environment 200 generally comprises a central processing unit (CPU) 202, a main memory 204 for storing Rete network module 206, an input/output (I/0) device 208, and a buffer 212. CPU 202, main memory 204 and buffer 212 communicate via a host bus 214. I/O device 208 and buffer 212 communicate via a system bus 216.

In the preferred embodiment, the configuration depicted in FIG. 2 is that of an IBM PS/2 personal computer workstation environment. The IBM PS/2 in fully explained in the IBM PS/2, Guide to Operations Manual, Armonk, N.Y., USA. This reference is hereby incorporated by reference in its entirety into this specification.

It should be understood that the computer components/subsystems which make up computer environment 200 are of conventional design. Any suitable presently available or future developed computer component/subsystems can be used. By way of example only, the present invention can be integrated with other configurations such as a main frame computer. It should also be understood, that the present invention typically is operated in conjunction with additional software modules (not shown). Such additional software modules may be necessary so that a expert system application can be developed.

It should also be understood that Rete network module 206 can be represented in a variety of other configurations. By way of example only, Rete network module 206 may take the form of hardware or firmware which may be configured in a read only memory (ROM) device (not shown). Moreover, Rete network module 206 may take the form of multiple configured ROMS, where each ROM executes a specific operation analogous to that executed by Rete network module 206.

Figure 3:
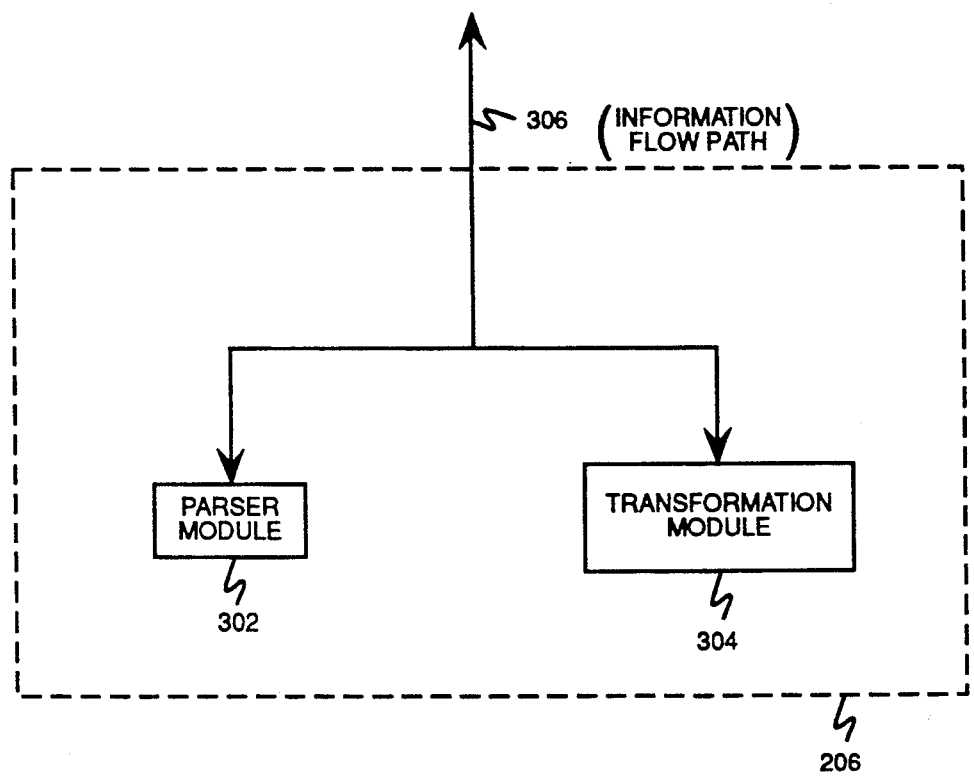
FIG. 3 is a high level block diagram showing the environment of the Rete network building module 206 of the present invention.

A high level structural representation of Rete network module, 206 is shown in FIG. 3. As shown, Rete network module 206 comprises a parser module 302 and a transformation module 304.

Parser module 302 has the function of extracting and interpreting the rules entered by the user, and generating data indicative of those rules stored in memory device 204 (FIG. 2). Once stored in memory device 204, the rules can be operated on by transformation module 304 to build the Rete network. Generally, parsers are well known in the art. Moreover, most computer systems typically use a parser. A parser, however, is usually custom designed to meet the specific requirements of each system.

Figure 4:
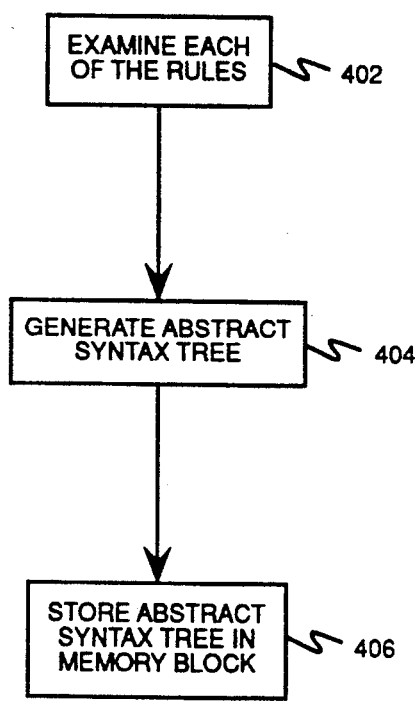
FIG. 4 is a block diagram showing the operation of the parser module 302 of the present invention.

FIG. 4 is a block diagram showing high level operation of the parser module 302 of the present invention. As shown by an operational block 402, parser module 302 instructs CPU 202 to first examine each of the rules (which, as stated above, are expressed in a syntax analogous to First Order Predicate Logic). As indicated by an operational block 404, parser module 302 then instructs CPU 202 to generate an abstract syntax tree for each rule. As shown by an operational block 406, parser module 402 then instructs CPU 202 to store the abstract syntax tree for each rule in the memory device 204 for subsequent processing by the transformation module 304.

It is apparent to one skilled in the art, that many languages can be developed that follow First Order Predicate Logic. In the preferred embodiment of the present invention, parser module 302 can recognize and process rules in a syntax referred to by the inventors as KRL. KRL stands for Knowledge Representation Language. The KRL syntax is fully explained in The INTEGRATED REASONING SHELL REFERENCE MANUAL, IBM, (1989) First Edition, June 1989 This manual is incorporated by reference in its entirety into this specification.

KRL rules are structured in the form of If-Then statements. In the present invention, the user can enter the If portion of a KRL rule in either conjunctive, disjunctive or negated form. As will become apparent, the present invention can be used to process any syntax language that allows a user to enter the If portion of a rule in either conjunctive, disjunctive or negated form.

The KRL syntax is only one language of which the present invention can recognize and process. Other languages (syntaxes) presently available or developed in the future can be used. As is apparent to those skilled in the art, in such situations parser module 302 will have to be modified (customized) to meet the formalities of the syntax actually employed.

It is helpful for the purposes of this discussion to represent KRL rules at a slightly higher level of abstraction. This abstraction is referred to herein as KRL shorthand.

In KRL shorthand, a complete intra-element or inter-element test is denoted with a single letter. For example, in a rule condition which tests whether the color (attribute) of a car (object) is blue (value of attribute), the KRL would look like the following:

x:car If x.color='Blue' then . . .

In KRL shorthand, we would simply write:

If A then . . .

Where A is taken to mean the entire condition test.

There is no advantage to KRL shorthand over KRL except as a device for understanding the salient elements of a rule for the purposes of Rete network construction.

All example rules herein are denoted in KRL shorthand, although it should be understood that the preferred embodiment of the present invention would actually use KRL.

Referring again to the KRL example, a notation of the LHS of a rule, designated Rule 1.0, can be written in conjunction form as follows:

Rule 1.0.
In KRL—x:car:If x. color='Blue' and x. wheels=4 then . . .
In KRL shorthand—If A and B then . . .

In KRL shorthand, symbols A and B each denote a separate test within rule 1.0. Each test can correspond to an intra-element test on an object, or to an inter-element test on several objects. As discussed below, the present invention can recognize the arbitrary specification of tests against objects. For example, test A could correspond to whether the color of a car is blue. Test B could correspond to whether the same object has four wheels (another attribute-value pair).

Conventional Rete network building systems and methods, unlike the present invention cannot recognize and process the above specified arbitrary conjunction of tests.

The following is a notation of the LHS of a KRL rule, designated Rule 2.0, which is written in disjunctive form:

Rule 2.0 If A or B then . . .

The following is a notation of the LHS of two KRL rules, designated Rules 3.0 and 3.1 respectively, that are written in negated form:

Rule 3.0 If NOT(A and B) then . . .
Rule 3.1 If NOT(A or B) then . . .

Parser module 302 of the present invention is designed to process (parse) rules expressed in either conjunctive, disjunctive or negated form. Parser module 302 also is designed to process the arbitrary specification of tests against the objects. In addition, parser module 302 is designed to process the action part of the rule (i.e. the RHS).

As discussed above in connection with the operational block 404, parser module 302 generates an abstract syntax tree for each KRL rule. Abstract syntax trees are well known in the art. The abstract syntax tree is a convenient method of representing an expression in memory device 204 for subsequent processing by transformation module 304. The data structure is stored in memory device 204. In the preferred mode, the abstract syntax tree is a data structure representative of a KRL rule.

By way of example only, consider the following abstraction of a KRL rule, designated Rule 4.0, which is shown in KRL shorthand:

Rule 4.0 If (A and B and C and D) then . . .

Figure 5:
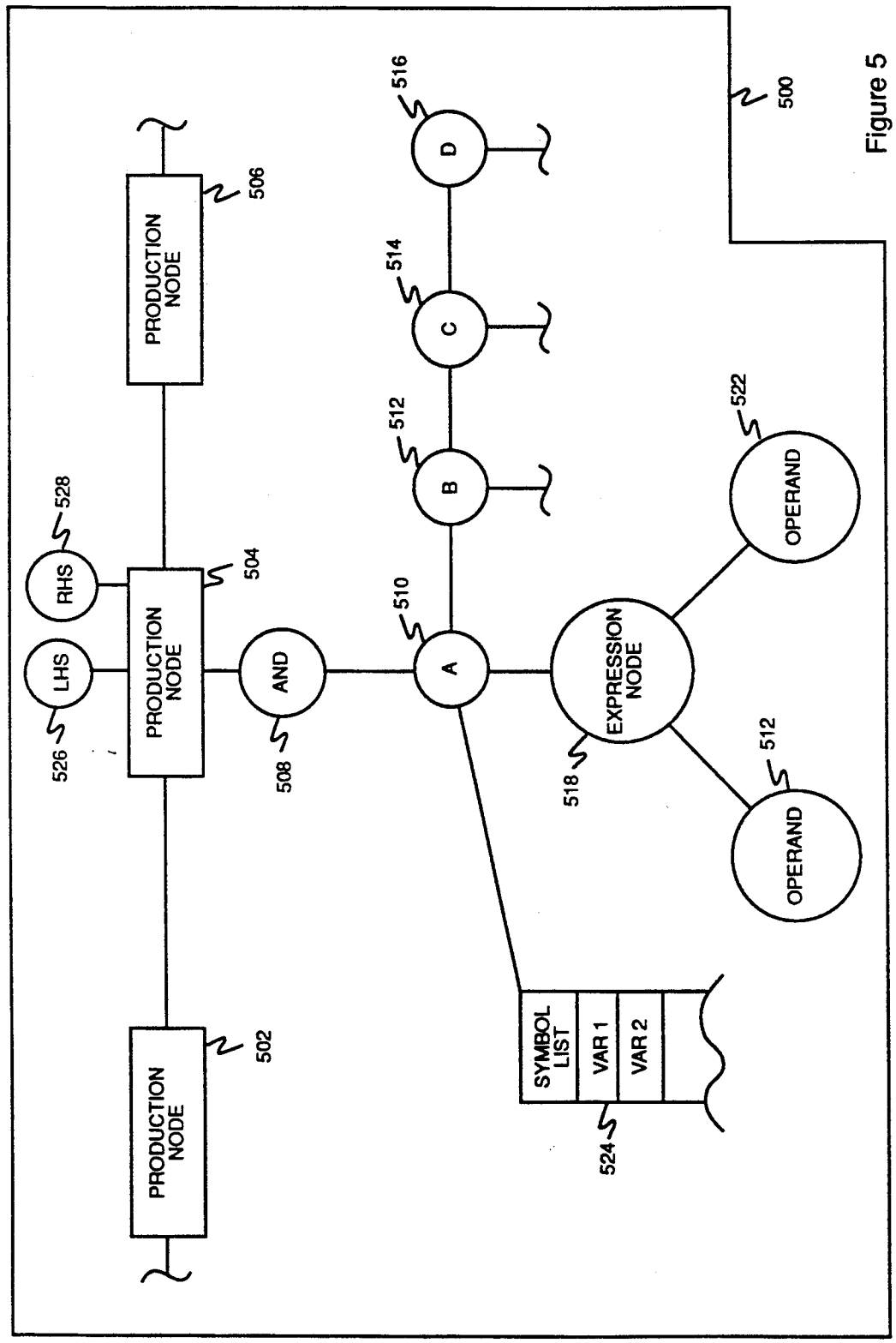
FIG. 5 is a block diagram showing the typical data structure of a parse tree 500 for a given rule of the present invention.

FIG. 5 shows the abstract syntax tree corresponding to Rule 4.0 built by parser module 302. The abstract syntax tree for Rule 4.0 comprises a production node 504, an AND node 508, a test A node 510, a test B node 512, a test C node 514, and a test D node 516. Production node 504 is the location in memory device 204 for that rule. Every rule has an associated production node. Also shown are production nodes 502 and 506. Production nodes 502 and 506 are shown to illustrate that each production node is connected.

AND node 508 is the highest level of the abstract syntax tree. AND node 508 denotes the conjunctive relationship between the tests A, B, C, and D: test A node 510, test B node 512, test C node 514, and test D node 516.

Also shown is an expression node 518. Expression node 518 represents the mathematical operation that may be performed in the test A (test node 510). For example, the mathematical operations of the type, $=$, $>$ or $<$, $>=$, $<=$, $=$ may be performed. A mathematical expression, for example, may be the following test: $x=4$.

Further shown in FIG. 5 is a symbol list node 524 of the present invention. Symbol list node 524 provides a summation list of the unique variables that are used in expression node 518 of test node 510. Symbol list nodes of the present invention provide a convenient way to summarize object(s) occurring in each test condition. As is discussed below, symbol lists are an important aspect of the present invention. Symbol lists allow a flow list (to be discussed) and thus the Rete network to be easily constructed. For the present moment, it is important to understand that symbol lists represent a list stored in the memory device 204 which contains all of the unique variables associated with a given test.

As is discussed below, the important information that is needed to build the Rete network for a given rule is which objects are associated with each condition test of a rule, how many are unique, and whether the objects are negatively quantified. In particular, the quantity of objects involved in a given test node dictates whether the test node will be represented as a one-input node or a two-input node in the Rete network.

Figure 6:
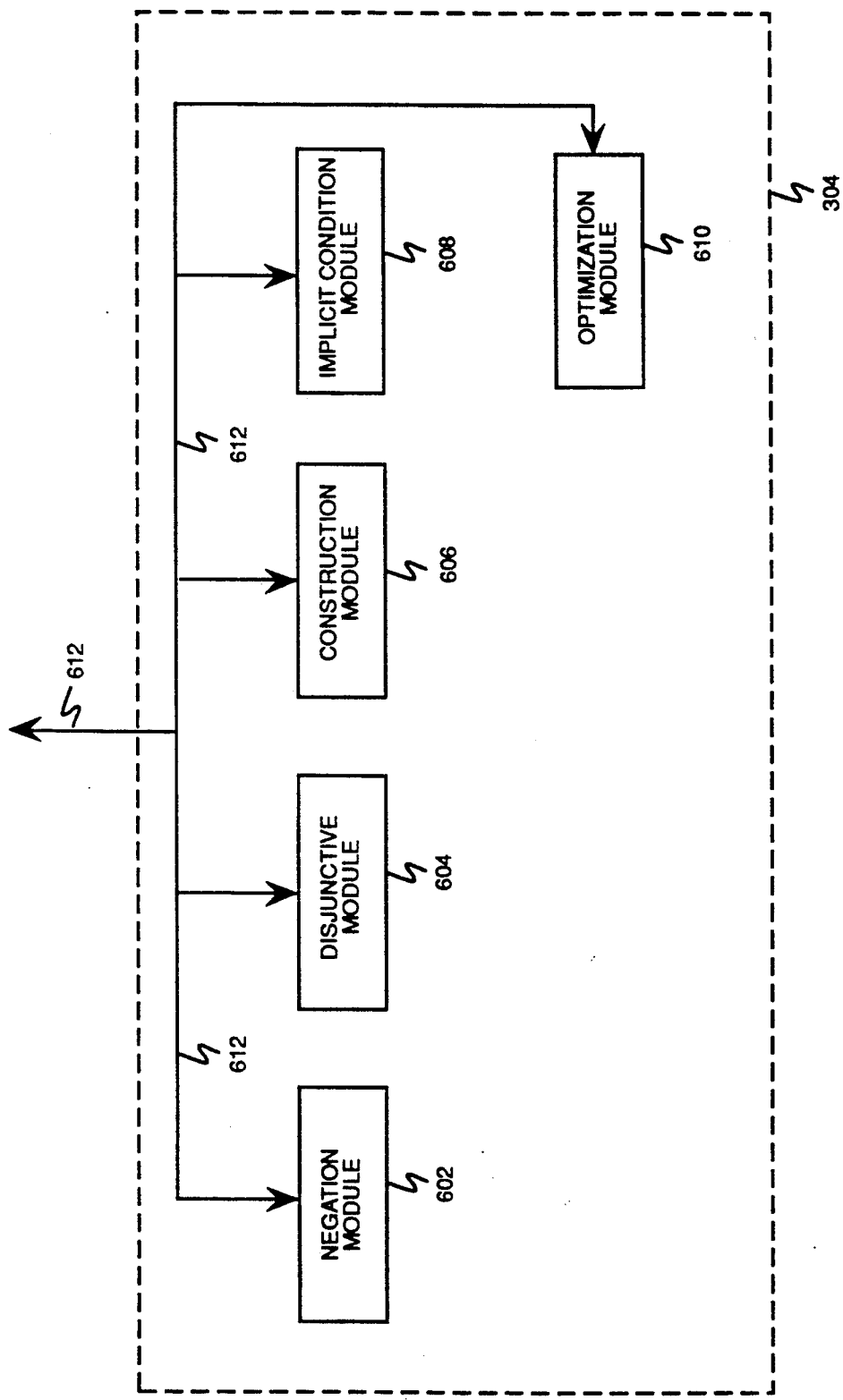
FIG. 6 is a block diagram showing the architecture of the transformation module 304 of the present invention.

A high level block diagram of the transformation module 304 is shown in FIG. 6. As shown, transformation module 304 comprises a negation module 602, a disjunctive module 604, a construction module 606, an implicit condition module 608, and an optimization module 610. The operation of these modules is explained in connection with FIG. 7.

Figure 7:
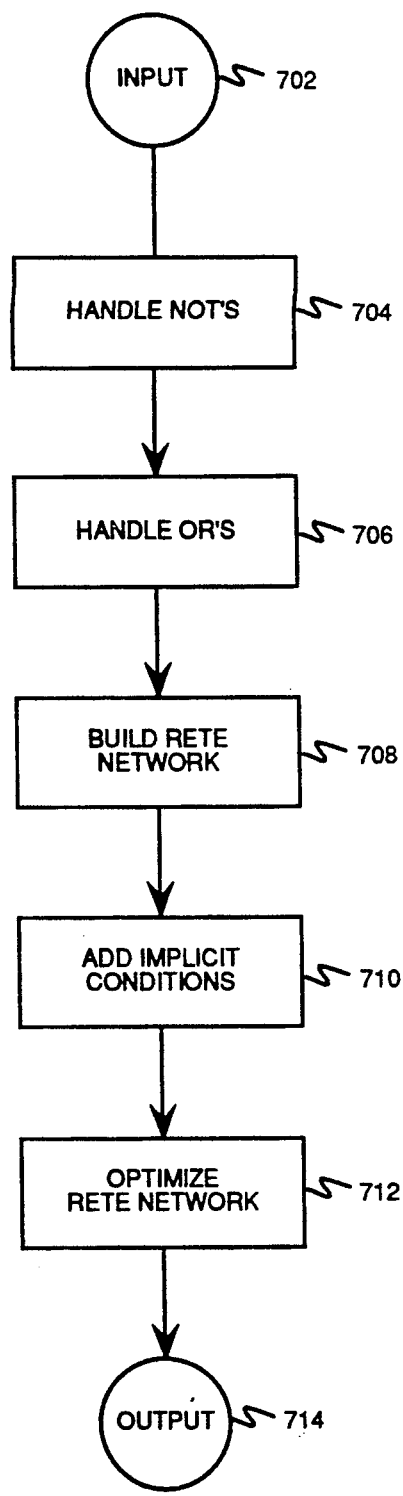
FIG. 7 is a block diagram showing the operation of the transformation module 304 of the present invention.

FIG. 7 is a block diagram showing at a high level the operation of the transformation module 304. As represented by an operational block 704 (this is called "handle not's"), transformation module 304 instructs CPU 202 to first examine each abstract syntax tree and to determine whether the rule is negated. If the rule is negated, transformation module 304 instructs CPU 202 to remove the negation. In the preferred embodiment, this is the first operation performed by transformation module 304. In transformation module 304, this operation is performed by negation module 602 (FIG. 6). It should be understood, however, that the operation shown by operational block 704 does not necessarily have to be the first operation performed by transformation module 304. However, if the negation is not addressed first, additional or nodes may be introduced and further processing would be required. Thus, the preferred embodiment would be to remove negation first. Other methods are intrinsically less efficient.

As represented by an operational block 706 (called "handle OR's"), transformation module 304 then instructs CPU 202 to re-examine each abstract syntax tree and convert rules that are expressed in disjunctive format into conjunctive normal form. This operation is performed by disjunctive module 604 (FIG. 6).

In the preferred embodiment, the above disjunctive format operation is the second operation performed by transformation module 304. It should be understood, however, that the operation shown by operational block 706 does not necessarily have to be the second operation performed by transformation module 304. For example, the operation shown by operational block 706 could be the first operation followed by the operation shown by operational block 704. However, as discussed earlier, the preferred embodiment is to remove negation first.

The operations depicted by blocks 704 and 706 are preprocessing operations that take place prior to the building of the Rete network. These operations allow the user to express a given rule in a negated and/or disjunctive form. These operations are significant features of the present invention.

As represented by an operation block 708, transformation module 304 then instructs CPU 202 to build the Rete network of the present invention. Operational block 708 denotes the actual building process of the Rete network. This operation is performed by the construction module 606 (FIG. 6).

As represented by an operation block 710, module 304 then instructs CPU 202 to add implicit conditions, if they are necessary. Operational block 710 denotes the process of checking each object in the RHS of the rule to ensure that it is present on the LHS of the rule. This operation is performed by implicit condition module 608 (FIG. 6).

As represented by an operational block 712, transformation module 304 finally instructs CPU 202 to optimize the Rete network of the present invention. Operational block 712 denotes the process of reconstructing the Rete network so that a test which appears in two or more rules shares the same test node. This operation is performed by optimization module 610 (FIG. 6).

The structure of the transformation module 304 is now discussed. Note that negation module 602 is shown in expanded form in FIG. 8 (in addition to its general form in FIG. 6). As shown, negation module 602 comprises a negation downward module 802, an elimination AND module 804, and an elimination OR module 806.

Negation downward module 802 is provided so that the computer environment 200 recognizes a negated rule. Rule 5.0 shown below is an example of a negated rule represented in syntactic notation:

Rule 5.0 If NOT (A and (B or C) and NOT D)

As shown above, the entire expression or LHS is negated.

Figure 9:
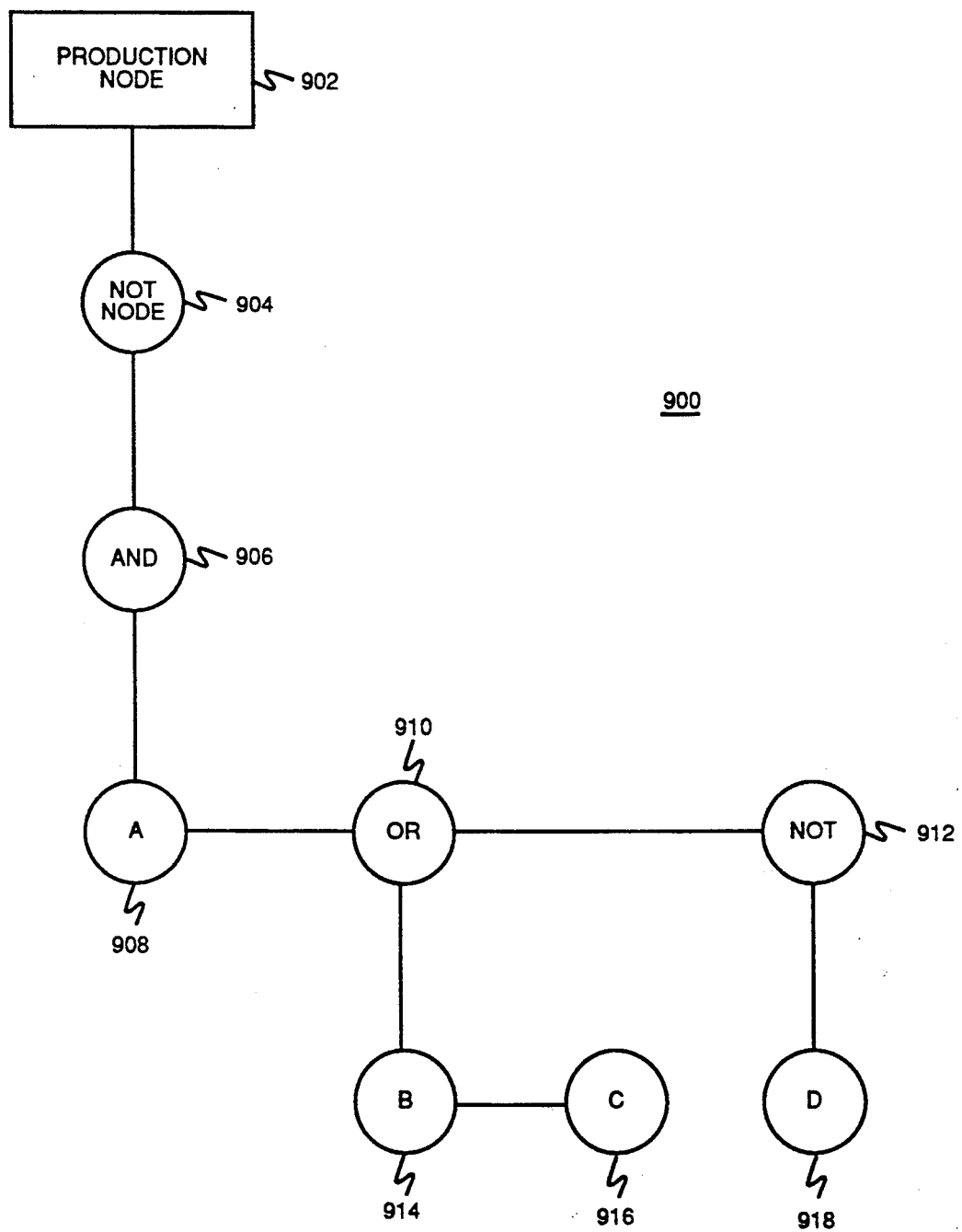
FIG. 9 is block diagram showing the data structure for a parse tree 900 indicative of a negated rule.

The abstract syntax tree for rule 5.0 is shown in FIG. 9.

Figure 8:
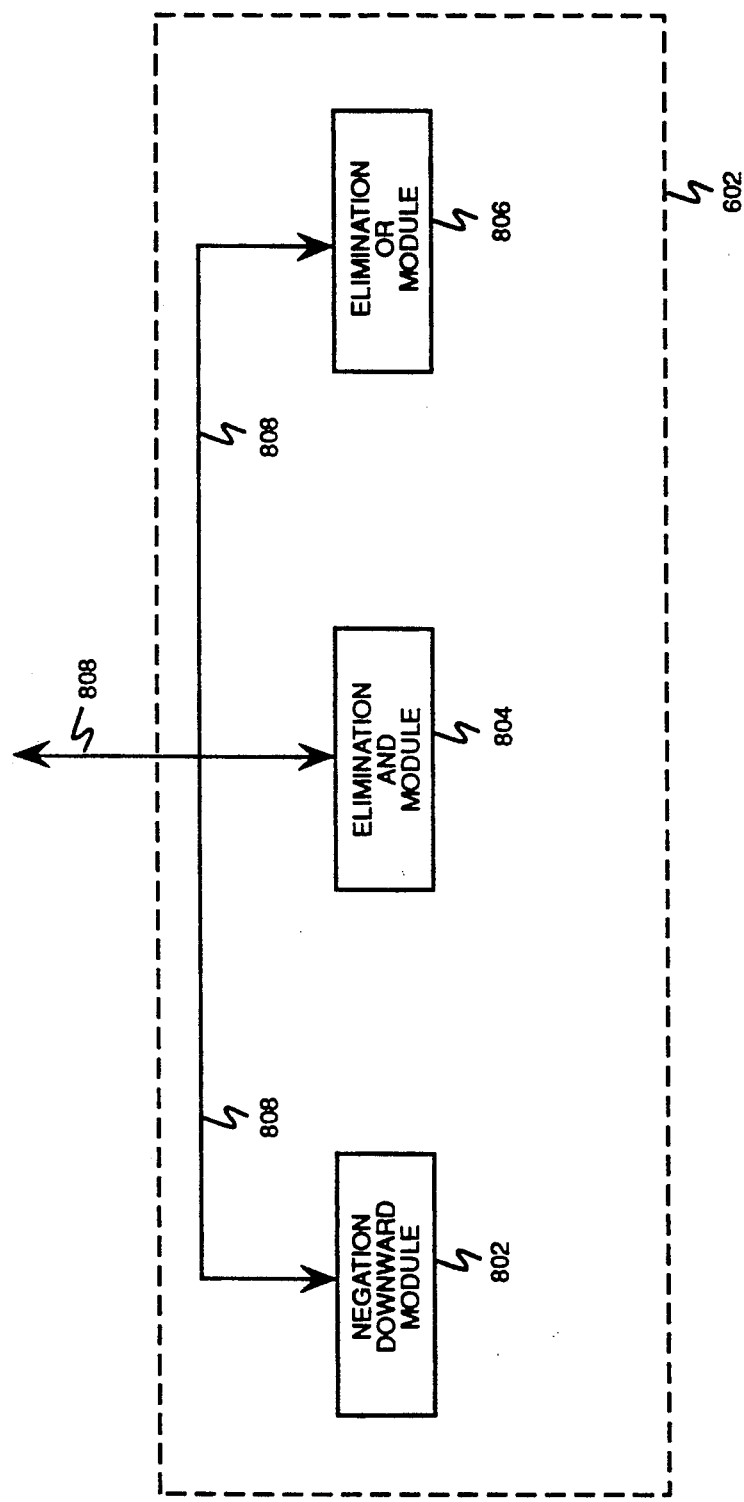
FIG. 8 is a block diagram showing the architecture of the negation module 602 of the present invention.

The following is a discussion of the operation of negation (downward) module 802 shown in FIG. 8 in conjunction with the abstract syntax free of FIG. 9. Negation downward module 802 instructs CPU 202 to examine the abstract syntax tree for each rule (and thus rule 5.0) and determine whether it is a negated rule. In the rule 5.0 example, negation downward module 802 determines that rule 5.0 is negated. Negation downward module 802 then operates on the abstract syntax tree of rule 5.0 to remove the negated node. This is performed by applying De Morgan's Theorem and/or the Law of Double Negation to the LHS of rule 5.0. In other words, the negation denoted by NOT node 904 is pushed down to the individual propositions (conditions) within Rule 5.0.

Distributing the negation through the LHS of. Rule 5.0 results in the following syntactic notation:

LHS=NOT A OR (NOT B AND NOT C) OR D

Figure 10:
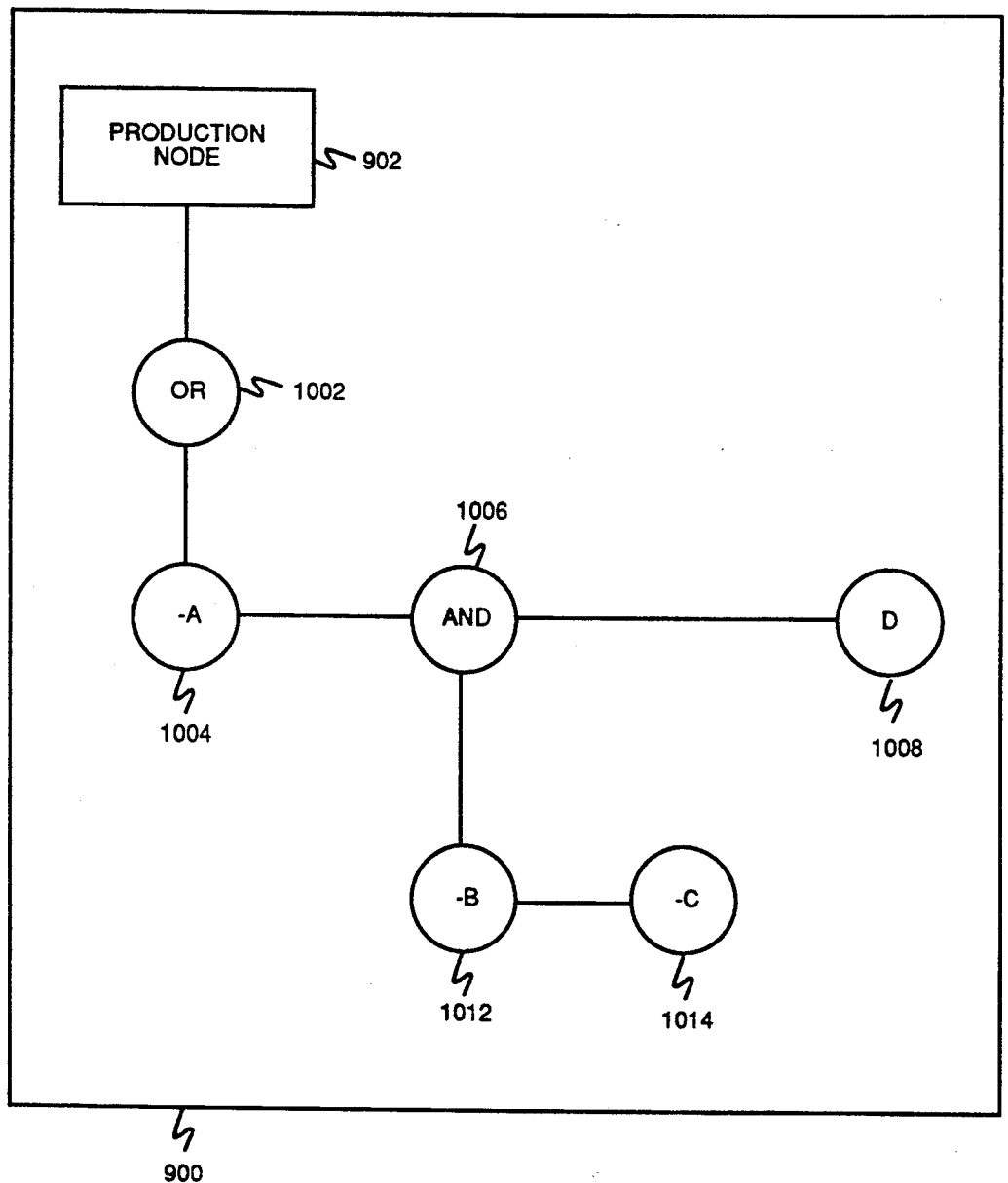
FIG. 10 is a block diagram showing the data structure for the parse tree 900 of FIG. 9 modified by the negation downward module 902 of the present invention to eliminate the negation.

FIG. 10 shows the modified abstract syntax tree after the negation as shown in FIG. 10 is pushed downward by negation module 802. It should be observed that negation of an AND node 906 of FIG. 9 is equivalent to an OR node 1002 of FIG. 10. In other words, they represent the expression NOT(A and B) =NOT A or NOT B. The latter expression, except for the disjunction, is in proper format for Rete networks. Likewise, negated OR nodes becomes AND nodes.

As can also be seen in FIGS. 9 and 10, a test A node 908 becomes a NOT Test A node 1004. The NOT nomenclature indicates that the negation has been pushed down to the condition level. As a practical matter, this means that a test which was for example z=4, now becomes Z not equal to 4. It should also be noticed that OR node 910 becomes AND node 1006. A NOT node 912 with a Test D node 918 becomes an ordinary test D node 1008. It should now be clear that the parse tree of FIG. 10 is in all respects equivalent to the parse tree of FIG. 9. In other words, the parse tree of FIG. 10 still represents the logical meaning of Rule 5.0 as originally expressed by the user.

In a conventional OPS5 system, the user is not able to write a negated rule as a whole. Instead, the user can only negate conditions individually. The present invention, and more particularly negation module 802, in contrast, performs this step for the user. It allows the user to represent a rule as a negated rule, which meaningful to the user.

Once a given rule has been "operated on" to ensure that negation (if present) has been pushed down to its lowest level (condition proposition level), the negation module 602 next performs the function of eliminating any redundant AND nodes. This function is performed by elimination AND module 804. An example rule, denoted Rule 6.0, containing redundant AND nodes is shown symbolically as follows:

Rule 6.0 (A AND B) AND (C OR D) AND G

Execution would continue for all successive layers of redundant AND nodes.

Figure 11:
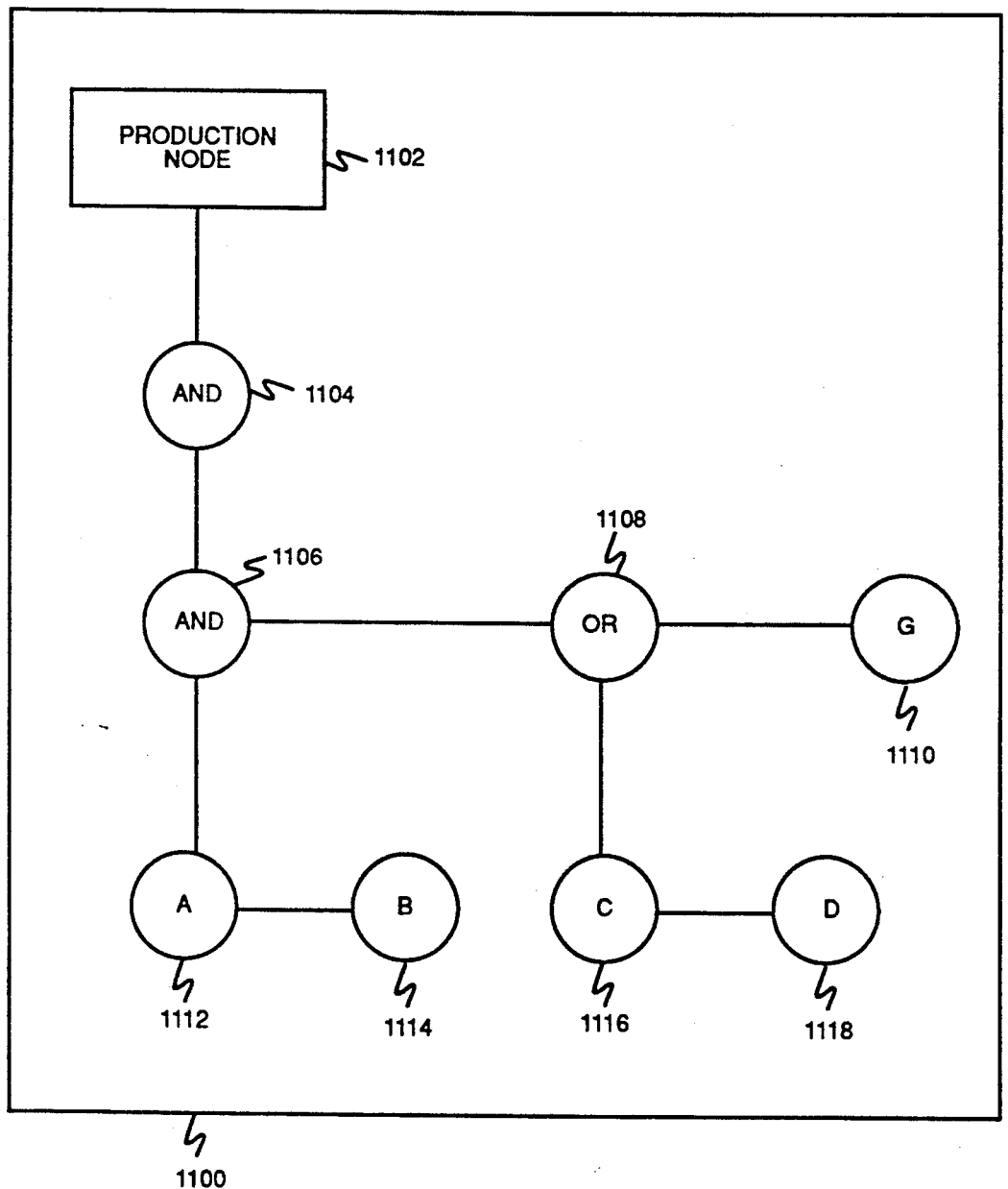
FIG. 11 is a block diagram showing the data structure for a parse tree 1100 indicative of a rule having redundant AND nodes.

The abstract syntax tree for Rule 6.0 is shown in FIG. 11. As can be seen, redundant AND nodes 1104 and 1106 exist. It should be noted that elimination of AND node 1106 will not affect the semantic meaning of Rule 6.0. Execution of elimination AND module 804 converts rule 6.0 into the following modified expression, indicated as Rule 6.1:

Rule 6.1 A AND B AND (C OR D) AND G

Figure 12:
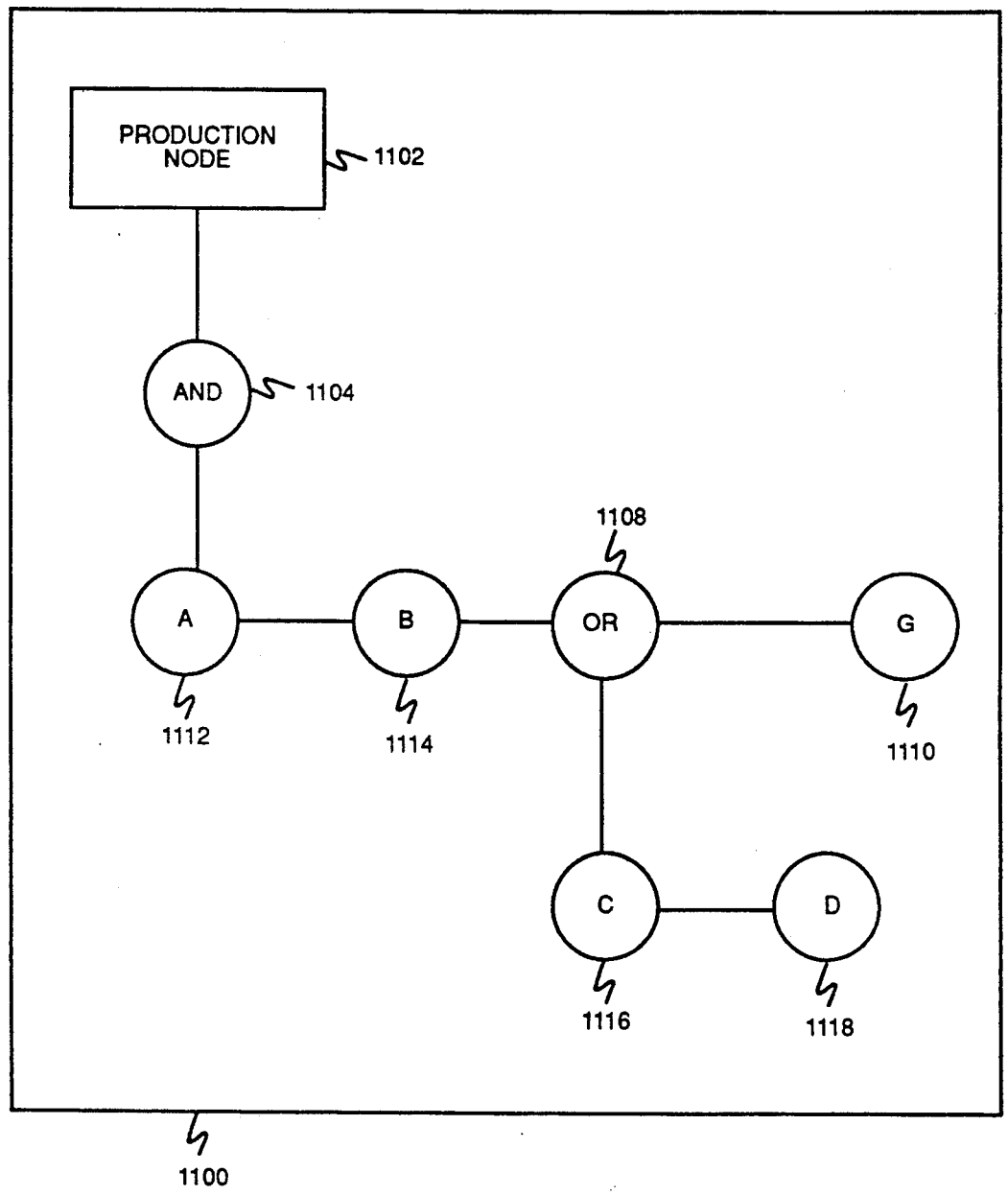
FIG. 12 is a block diagram showing the data structure for parse tree 1100 of FIG. 11 modified by the elimination AND module 804 of the present invention for removing redundant AND nodes.

The abstract tree for Rule 6.1 is shown in FIG. 12. Elimination AND module 804 performs the task of removing redundant AND node 1106. As can be seen, test A node 1112 and test B node 1114 of FIG. 11 have been "moved up" in the parse tree.

It should be noted, however, that elimination AND module 804 is not necessary to build a Rete Network in accordance with the present invention. Failure, however, to remove redundant AND nodes may result in a larger, and thus less efficient, Rete Network.

Elimination OR module 806 operates in a similar fashion to elimination AND module 804. The goal of Elimination OR module 806 is to remove redundant OR nodes.

Figure 13:
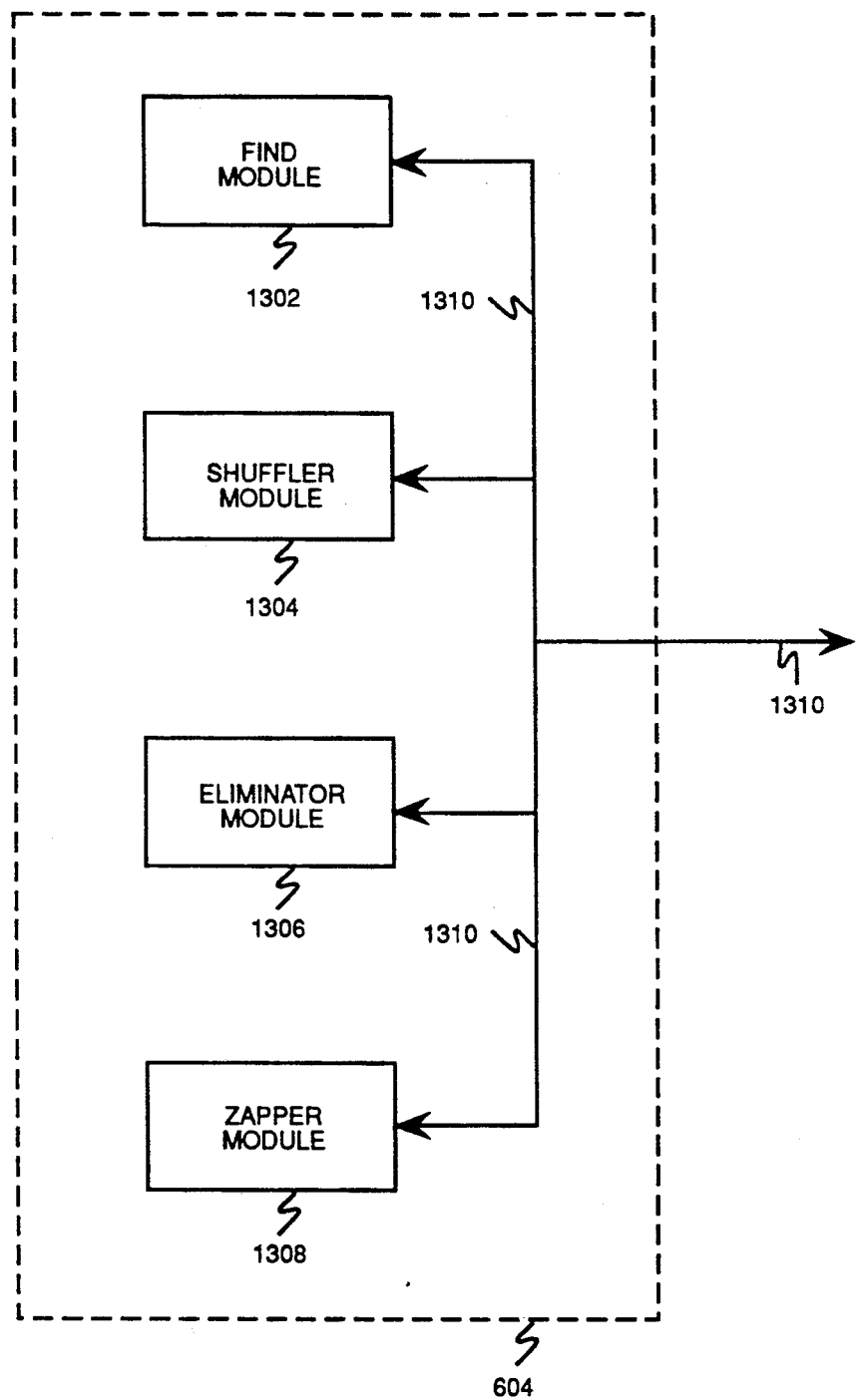
FIG. 13 is a block diagram showing the architecture of the disjunction module 604 of the present invention.

FIG. 13 shows the architecture for disjunctive module 604. Disjunctive module 604 has the function of removing disjunctions from each rule. Disjunction module 604 comprises a find module 1302, a shuffler module 1304, an eliminator module 1306, and a zapper module 1308.

Figure 14:
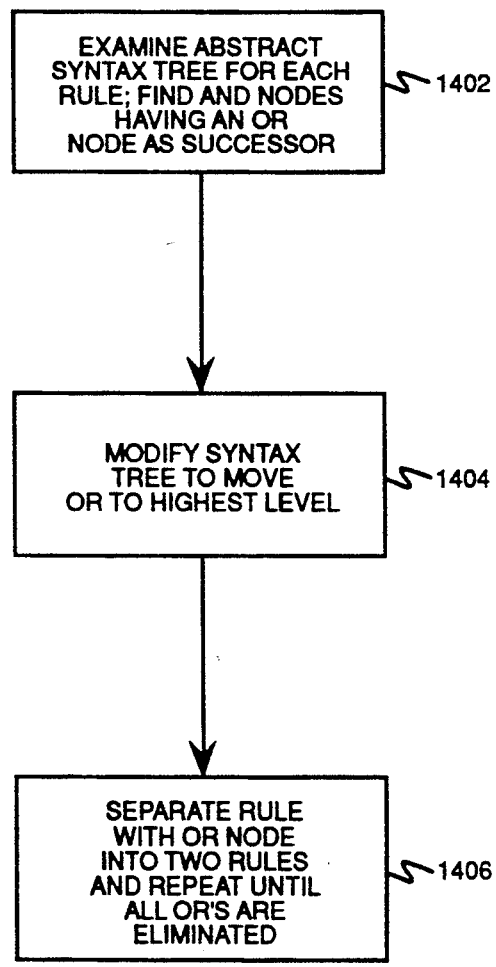
FIG. 14 is a block diagram showing the operation of the disjunctive module 604.

FIG. 14 is high level block diagram showing the operation of disjunctive module 604. As shown by an operational block 1402, disjunctive module 604 first instructs CPU 202 to examine each abstract syntax tree. As disjunctive module 604 further instructs CPU 202 to examine the abstract syntax tree, it operates to locate AND nodes that have an OR node as their successor. If an OR node is located, the next operation is performed.

As shown by an operational block 1404, disjunctive module 604 then instructs CPU 202 to "move up" the OR node to the highest predicate level in the abstract syntax tree. This operation is performed so that the one rule can be separated into two separate rules. This operation may take several iterations through the abstract syntax tree. Once disjunctive module 602 moves the OR to its highest predicate level, it then performs the next operation.

As shown by an operational block 1406, disjunctive module 604 then instructs CPU 202 to eliminate the OR node by creating two rules. In other words, disjunctive module 604 operates to create one rule for each "leg" of the disjunction. This operation is performed by application of the distributive law. This operation does not effect the semantic meaning of the rule as originally specified by the user; it simply reflects the fact that either side of the OR will suffice for purposes of matching the rule.

The architecture for each of the sub-components of disjunctive module 604 of FIG. 13 is as follows.

Find module 1302 has the function of examining each of the abstract syntax tree to locate AND nodes that have an OR node as their successor node. If find module 1302 locates such an OR node, find module 1302 then passes control to shuffler module 1304.

Shuffler module 1304 reorganizes the nodes of a given abstract syntax tree such that the OR node moves to the top of the parse tree. Shuffler module 1304 reorganizes the abstract syntax tree without affecting the semantic meaning of the rule.

Consider the following example rule expressed in symbolic notation. This rule is denoted as rule 7.0:

Rule 7.0 (C OR D) AND E

Figure 15:
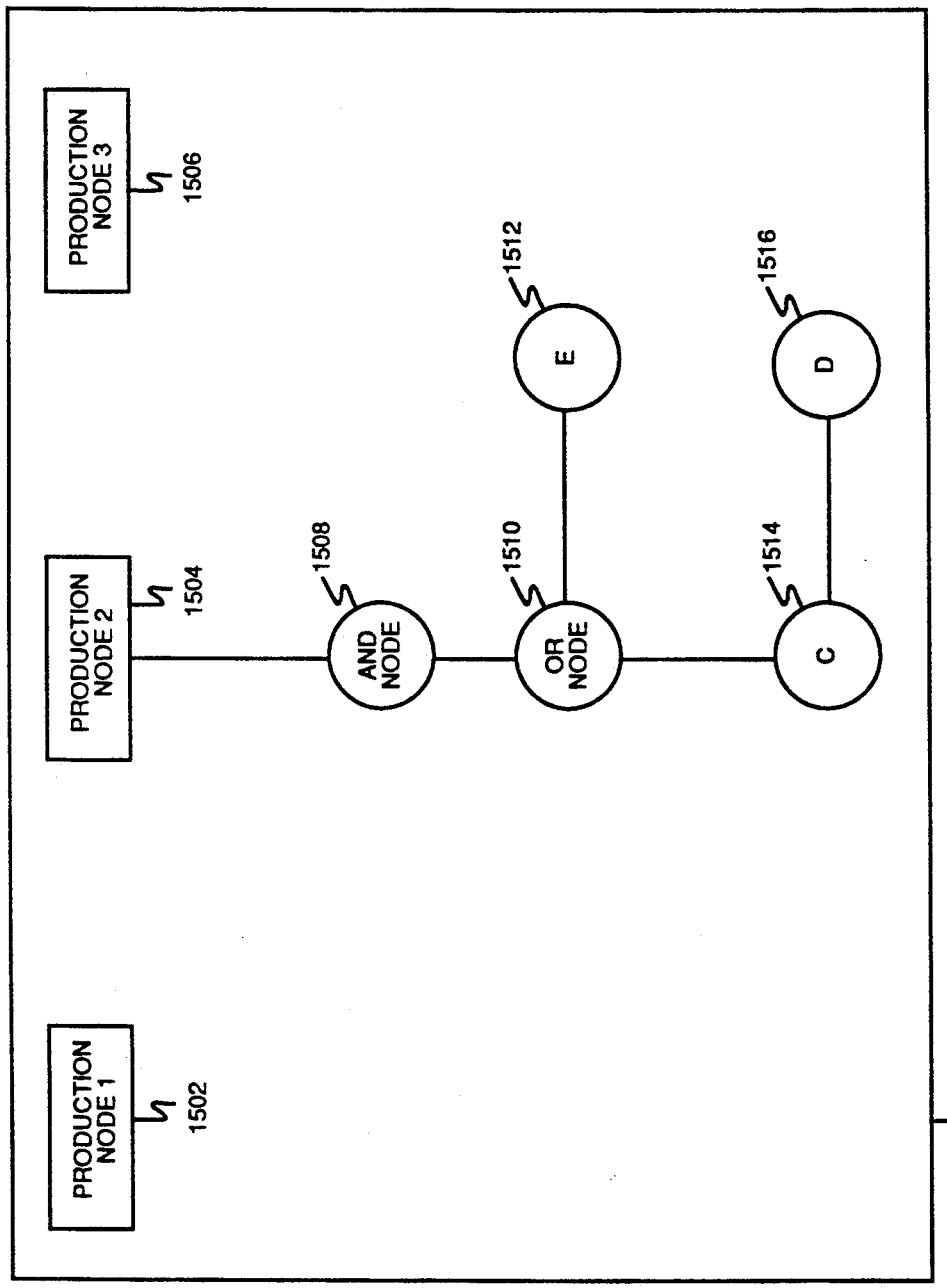
FIG. 15 is a block diagram showing the data structure for a parse tree 1500 indicative of a rule having disjunctive conditions therein.

The abstract syntax tree for rule 7.0 is shown in FIG. 15. Shown are production nodes 1502, 1504 and 1506. Production node 1504 corresponds to rule 7.0, for example. Further shown is AND node 1508 that has two successor nodes: OR node 1510 and test E node 1512. OR node 1510 has as its child node, test C node 1514 and test D node 1516.

By application of the distributive law, the symbolic notation denoting Rule 7.0 is equivalent to the following notation, which shall be identified as Rule 7.1:

Rule 7.1 (C AND E) OR (D AND E)

Figure 16:
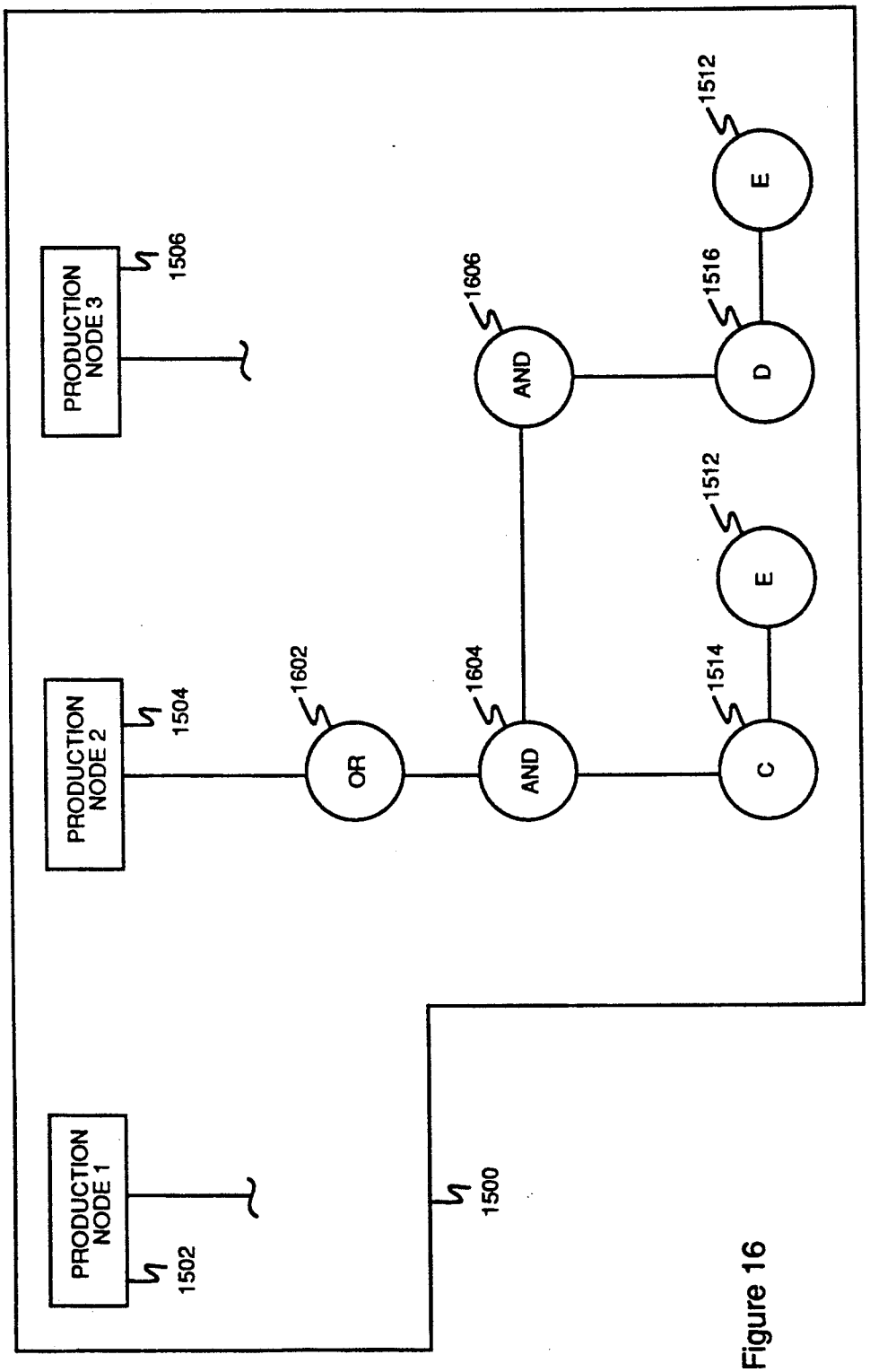
FIG. 16 is a block diagram showing the data structure for parse tree 1500 of FIG. 15 modified to show how the shuffler module 1304 of the present invention pushes the disjunction to the highest operative level of the parse tree.

As can be seen, the logic representation of rule 7.0 has been modified to the expression (C and E) or (,D and E). FIG. 16 shows the abstract syntax tree for modified rule 7.1. As shown, OR node 1602 (formerly OR node 1510 in FIG. 15) is at the top of the abstract syntax tree. OR node 1602 has now become the central operator in the rule. In order to maintain the semantic meaning of the rule, shuffler module 1304 also attaches a copy of all the siblings of original OR node 1510 (test E node 1512) with each of its child nodes: test nodes 1514 and 1516. In essence, test nodes 1514 and 1516 under previous OR node 1510 each become a child underneath an AND node. In FIG. 16, this is represented by test C node 1514 and test E node 1512 which are shown-as child nodes of AND node 1604. Likewise, test D node 1516 and test E node 1512 become child nodes of AND node 1606. It should be readily apparent that the abstract syntax tree of FIG. 16 has the same semantic meaning as does the abstract syntax tree of FIG. 15.

Disjunctive module 604 now operates to eliminate OR node 1602. This feature is performed with eliminator module 1306. Eliminator module 1306 instructs CPU 202 to examine the abstract syntax tree a third time to determine if an OR exists. As soon as it finds an OR node, eliminator module 1306 passes control to execute zapper module 1308.

The structure of zapper module 1308 is such that when executed it instructs CPU 202 to eliminate the OR node, and for each of the children of the OR node, to create a new rule node. The rule node is a clone of the previous rule node. Zapper module 1308, therefore, turns each of the children underneath an OR node into its own separate rule. In other words, each of the disjunctive legs is now represented as a separate abstract syntax tree.

Figure 17:
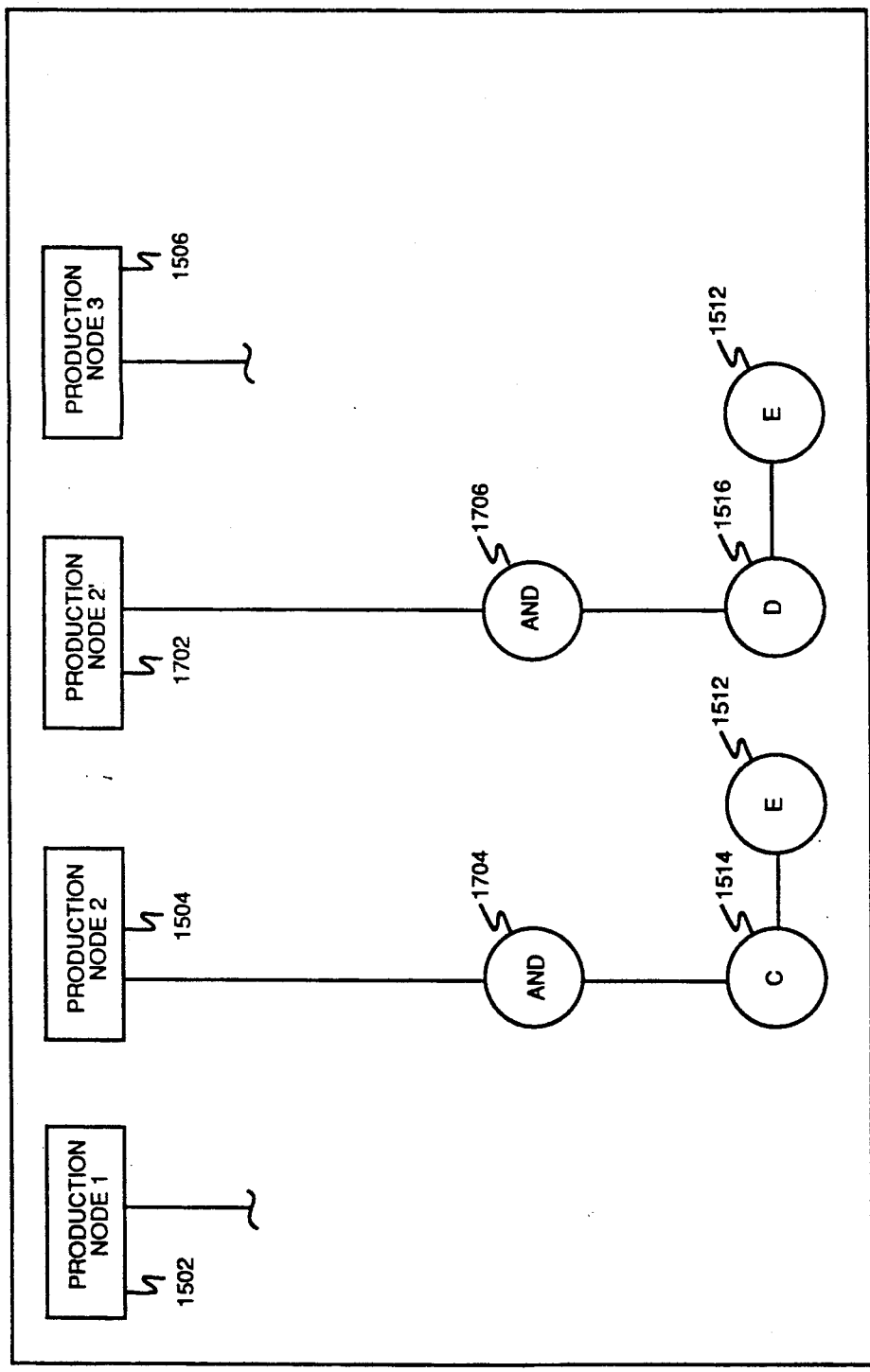
FIG. 17 is a block diagram showing the data structure for the parse tree of FIG. 16 modified by the eliminator module 1306 of the present invention into two parse trees so as to eliminate the disjunction.

FIG. 17 shows the abstract syntax tree for the above operation of zapper module 1308. As shown, zapper module 1308 has created two rules. The rules have rule nodes 1504 and rule node 1702 as their memory location. In essence, zapper module 1308 has taken AND node 1606 and its children of FIG. 16, and created a separate rule corresponding to rule 1702 of FIG. 17.

As can be seen from the above discussion, disjunctive module 604 operates on a rule written in disjunctive form and creates two separate rules. Analogous to negation module 602, disjunctive module 604 allows computer system environment 200 to recognize and process a rule which has an OR node in it. The present invention takes the complex rule and breaks it into two separate rules. This is performed so that the rule can be expressed in proper Rete network format. It should also be noted that OR nodes can occur on multiple levels. Disjunctive module 604 operates level by level until all OR nodes are pushed to the top of the parse tree.

At this point, the present invention has transformed the abstract tree for a given rule so that only AND nodes and test nodes are present. There are no NOT. nodes because they were eliminated by negation module 602. . There are no OR nodes because they were eliminated by disjunctive module 604.

Figure 18:
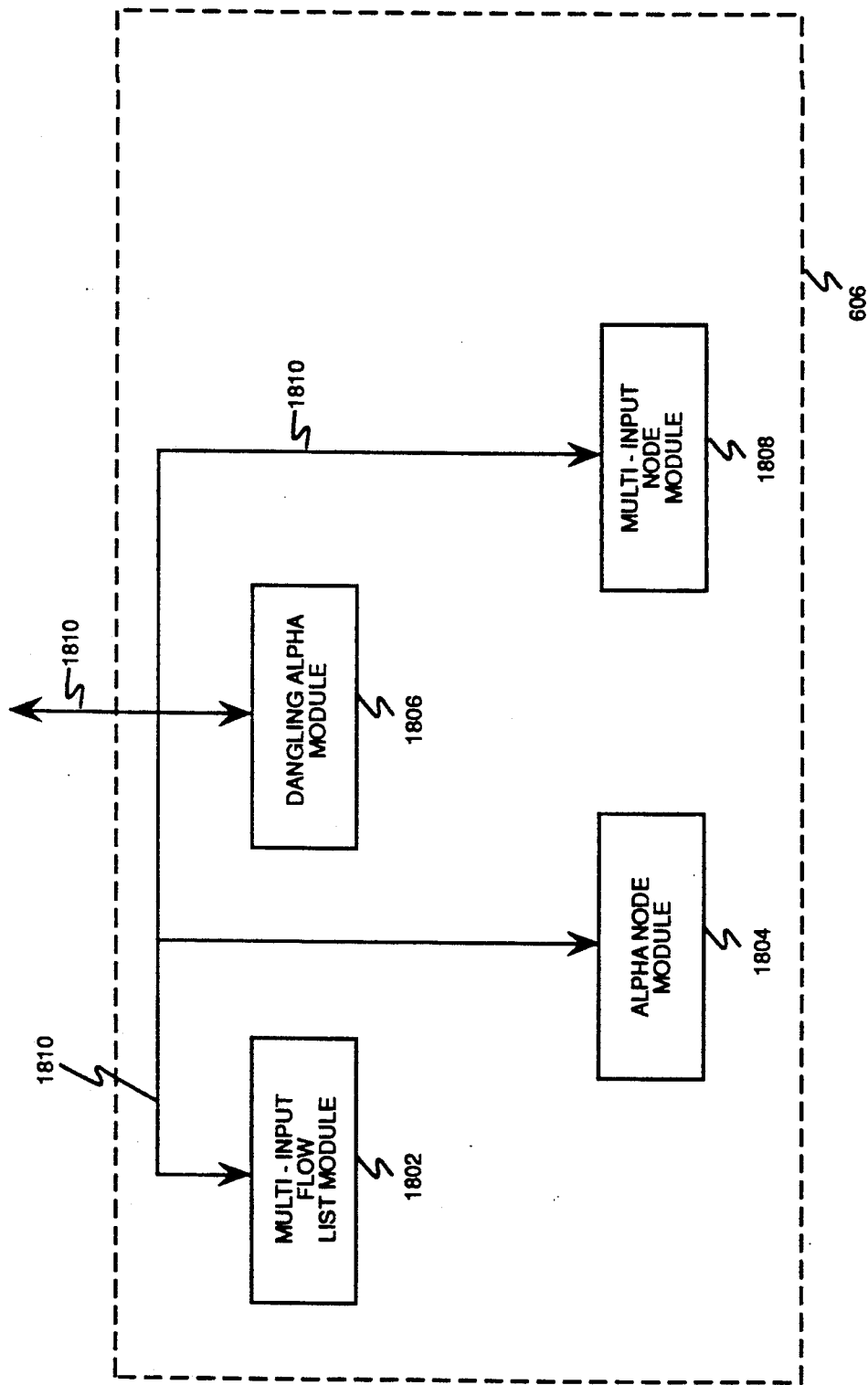
FIG. 18 is a block diagram showing the architecture of the construction module 606 of the present invention.

Construction module 606 now performs the task of organizing and building the rules into a Rete network. FIG. 18 shows a high level architectural block diagram of construction module 606. Construction module 606 comprises a multi-input flow list module 1802, an alpha node module 1804, a dangling alpha module 1806, and a multi-input node module 1808.

FIG. 19 is a block diagram showing a high level operation of construction module 606 of FIG. 18.

Figure 19A:
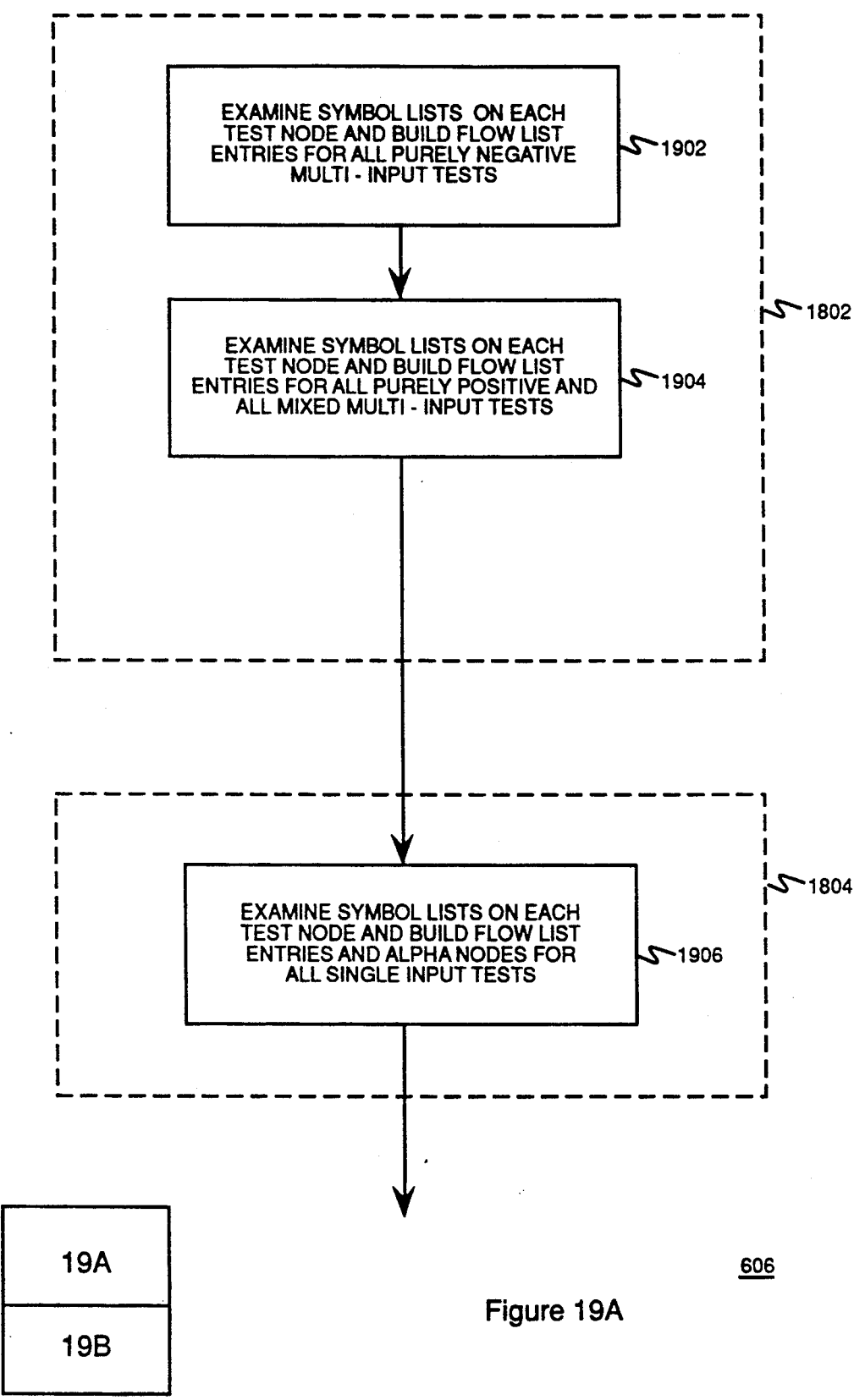
FIGS. 19A and 19B together are block diagrams showing the operation of the construction module 606 of the present invention;.
Figure 19B:
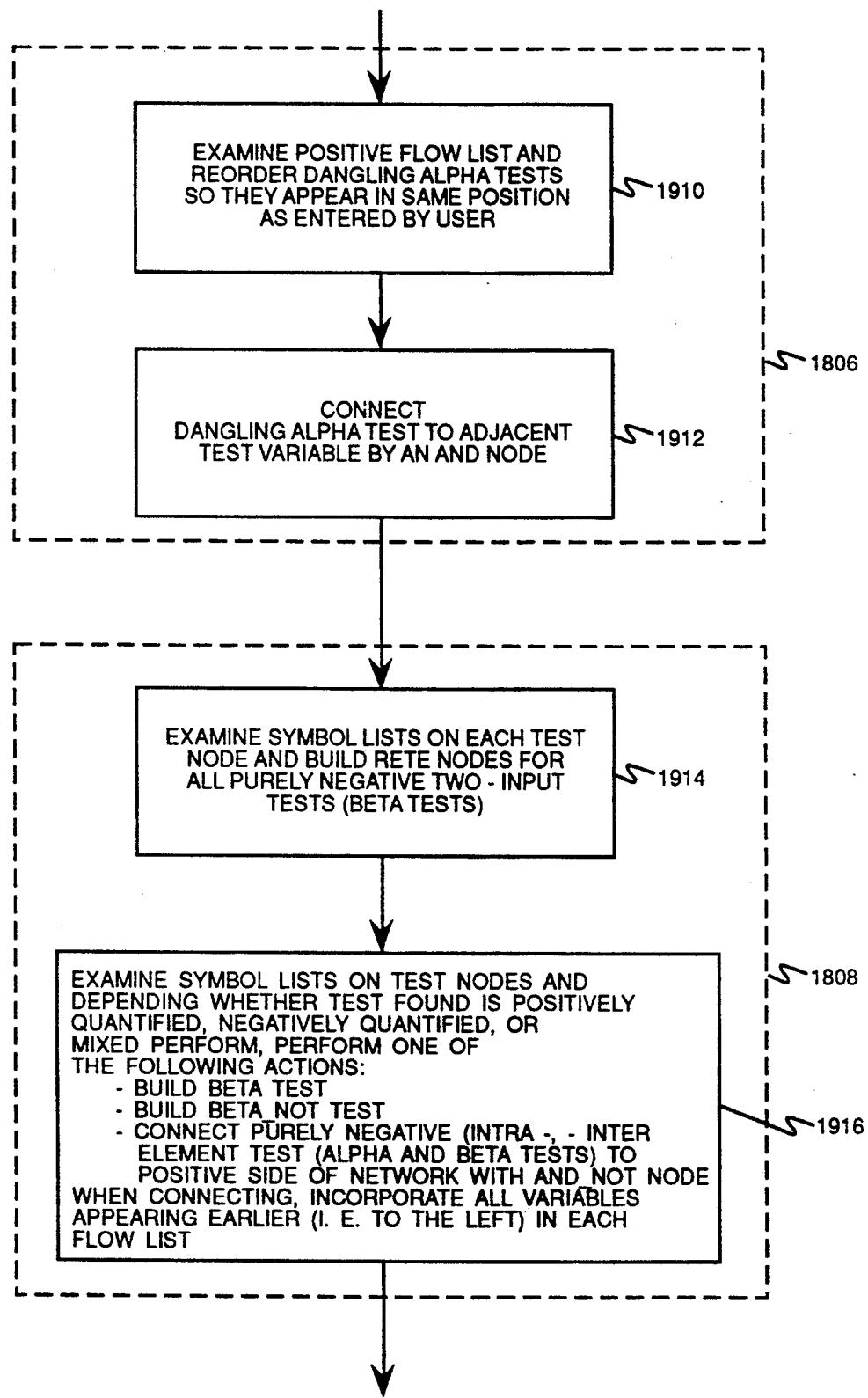

FIG. 19 is made up of FIGS. 19A and 19B. Referring now to FIG. 19A, the first step in building the Rete network, as shown by an operational block 1902, comprises examining the symbol list on each test node and building flow list entries for all purely negative multi-input tests. As shown by an operational block 1904, the second step in building the Rete network comprises re-examining the symbol lists on each remaining test node and building flow list entries for all other multi-input tests. As al so shown by FIG. 19A, the operational steps described by operation blocks 1902 and 1904 are performed by the multi-input flow list module 1802.

As shown by an operational block 1906, the next step in building the Rete network comprises re-examining the test nodes and building flow list entries and Rete nodes for all single-input tests (alpha tests). As is shown and described below, step 1906 is performed by the alpha node module 1804.

Referring now to FIG. 19B, the next step in building the Rete network, as shown by operational block 1910, comprises examining the positive flow list and reordering the dangling alpha tests. As shown by an operational block 1912, the next step in building the Rete network comprises connecting dangling alphas to their adjacent test neighbor on the right. As is shown by FIG. 19B, the two steps described by operational blocks 1910 and 1912 are performed by the dangling alpha module 1806.

As shown by an operational block 1914, the next step in building the Rete network comprises examining the multi-input tests and attaching beta tests onto the negative flow list for all purely negative tests. This step is performed by multi-input node module 1808.

As shown by an operational block 1916, the last step in building the Rete network for a rule is to re-examine, in sequence, each test node.

As described certain actions are performed depending upon whether the variables in the symbol list of a given test node are positively quantified, negatively quantified, or mixed. Specifically, if the test under examination is a positively quantified test then a BETA test is built. If the test under examination is a mixed quantification, then a BETA_NOT test is built. If the test under consideration is a single input negative test, then the purely negative test is connected to the positive side of the Rete network with an AND_NOT node. The above described step is also performed by the multi-input node module 1808.

All connections made at this point are built such that all variables appearing on the flowlists to the left of the variables in question are also incorporated. This step serves to connect up beta nodes that might otherwise get overlooked.

The general concept of a flow list is now discussed. A flow list is a significant feature of the present invention. The flow list is a dedicated block of working main memory 204 (see FIG. 2) that is updated as the Rete network is being built. The flow list also contains a complete set of the objects that are tested in a given rule. As will become more apparent, a flow list provides a convenient way of building a dense Rete network. The reason for this is that all the objects corresponding to a given test will be adjacent to one other.

In the preferred embodiment, the present invention uses two flow lists: a positive flow list, and a negative flow list. The positive flow list is an ordered listing of all unique positively quantified objects being tested in a rule. The negative flow list is an ordered listing of all negatively quantified variables being tested in a rule. As will become apparent herein, the use of two flow lists (one for positive variables and one for negatives variables) makes it significantly easier to build the Rete network.

Each of the sub-components of construction module 606 (multi-input flow list module 1802, alpha node module 1804, dangling alpha module 1806, multi-input node module 1808) is now described in more detail.

In operation, and referring again to FIG. 18, multi-input flow list module 1802 instructs CPU 202 to examine each symbol list and determine whether the test involves two or more objects. Multi-input flow list module 1802 upon detection of such objects instructs CPU 202 to add the objects to a flow list. In addition to the objects being added, multi-input flow list module 1802 stores in the flow list the relative order in which each object appears in the rule.

Multi-input flow list module 1802 generally comprises means for locating those objects that are involved in two input tests. Multi-input flow list module 1802 further comprises means for storing those objects into either the positive flow list or the negative flow list.

In the preferred embodiment, multi-input flow list module 1802 examines the abstract syntax tree for a given rule; it then first looks for negatively quantified multi-input test. Multi-input flow list module 1802 then re-examines the syntax tree for all other multi-input tests.

Figure 20:
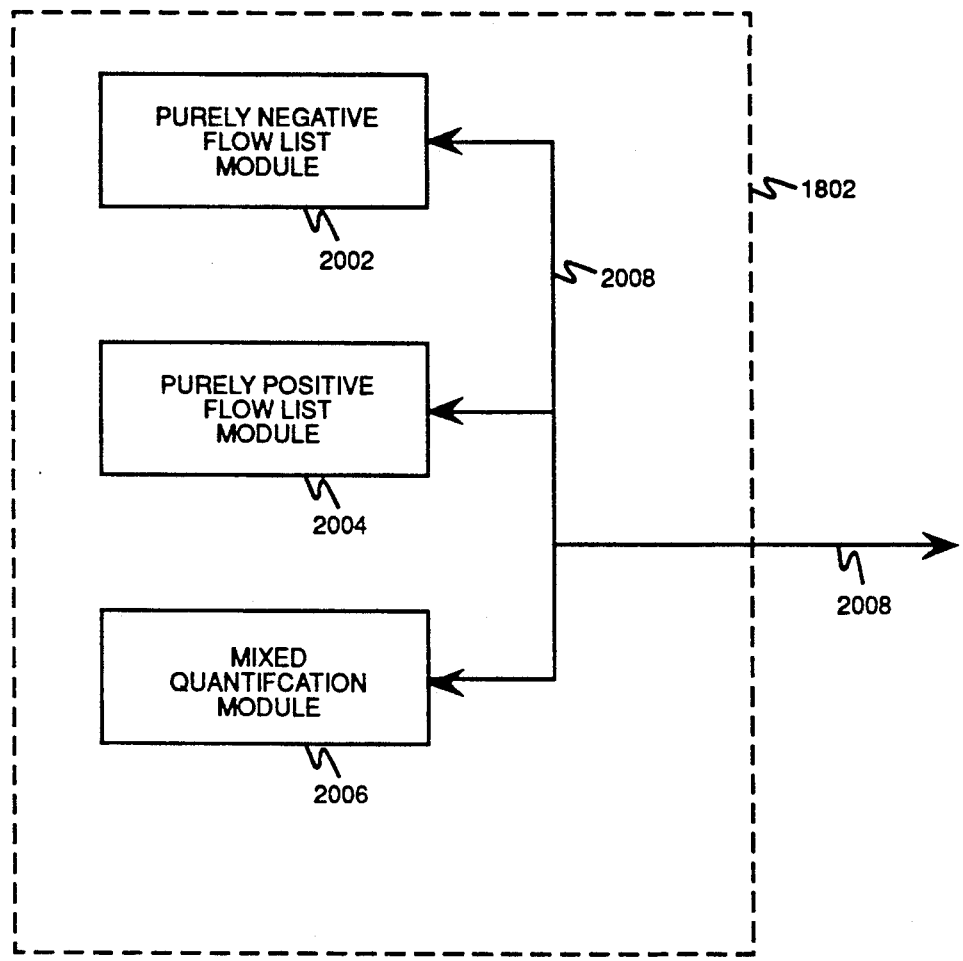
FIG. 20 is a block diagram showing the architecture of the multi-input flow list module 1802 of the present invention.

The architecture of the modules for performing the above operations is shown in FIG. 20. As shown, multi-input flow list module 1802 comprises a purely negative flow list module 2002, a purely positive flow list module 2004, and a mixed quantification module 2006.

Figure 21A:
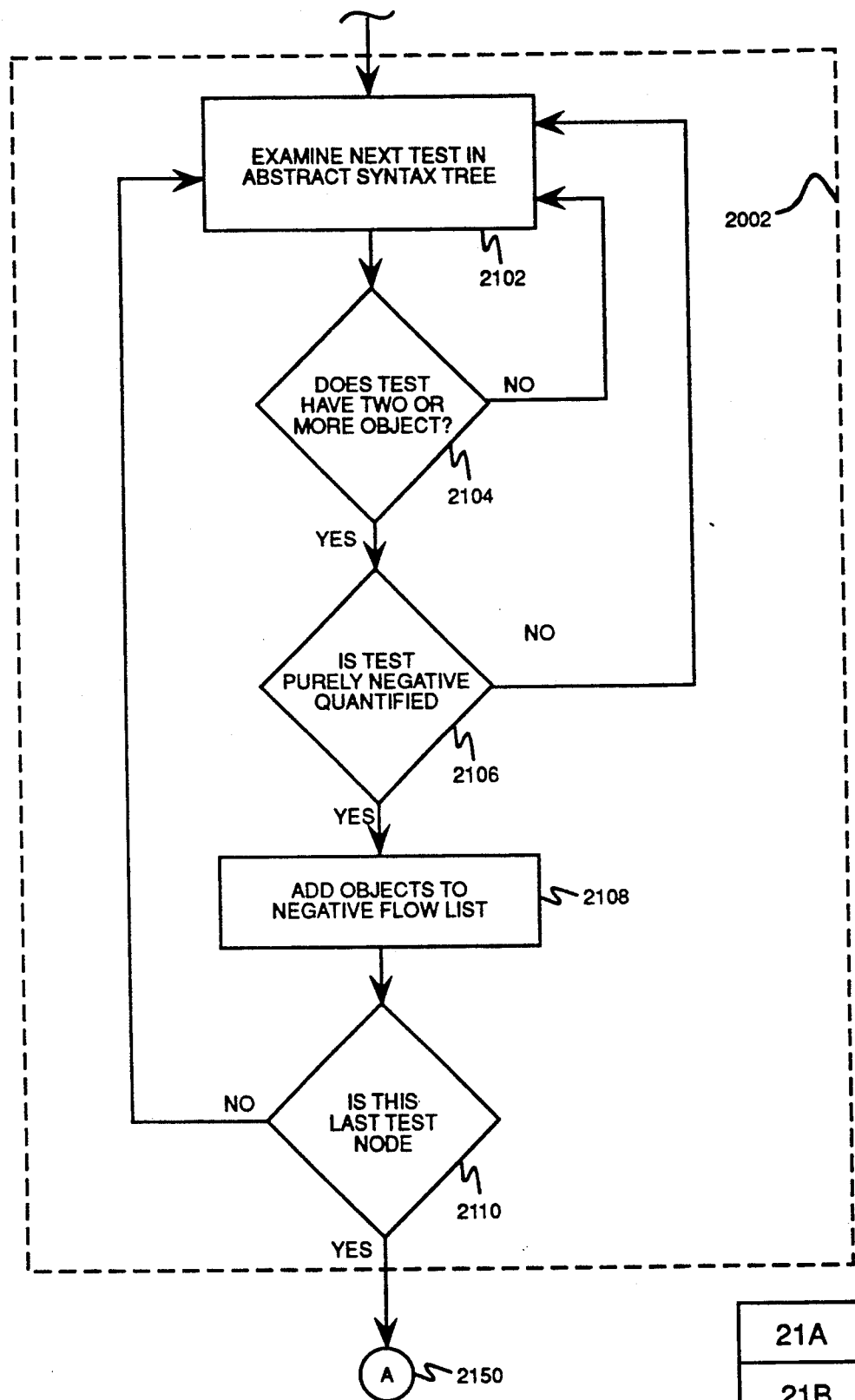
FIGS. 21A and 21B are a flow chart showing the operation of the multi-input flow list- module 1802 of the present invention. The flow chart begins on FIG. 21A and continues sequentially to FIG. 21B.
Figure 21:
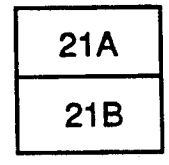
FIG. 21 is made up of FIGS. 21A and 21B.
Figure 21B:
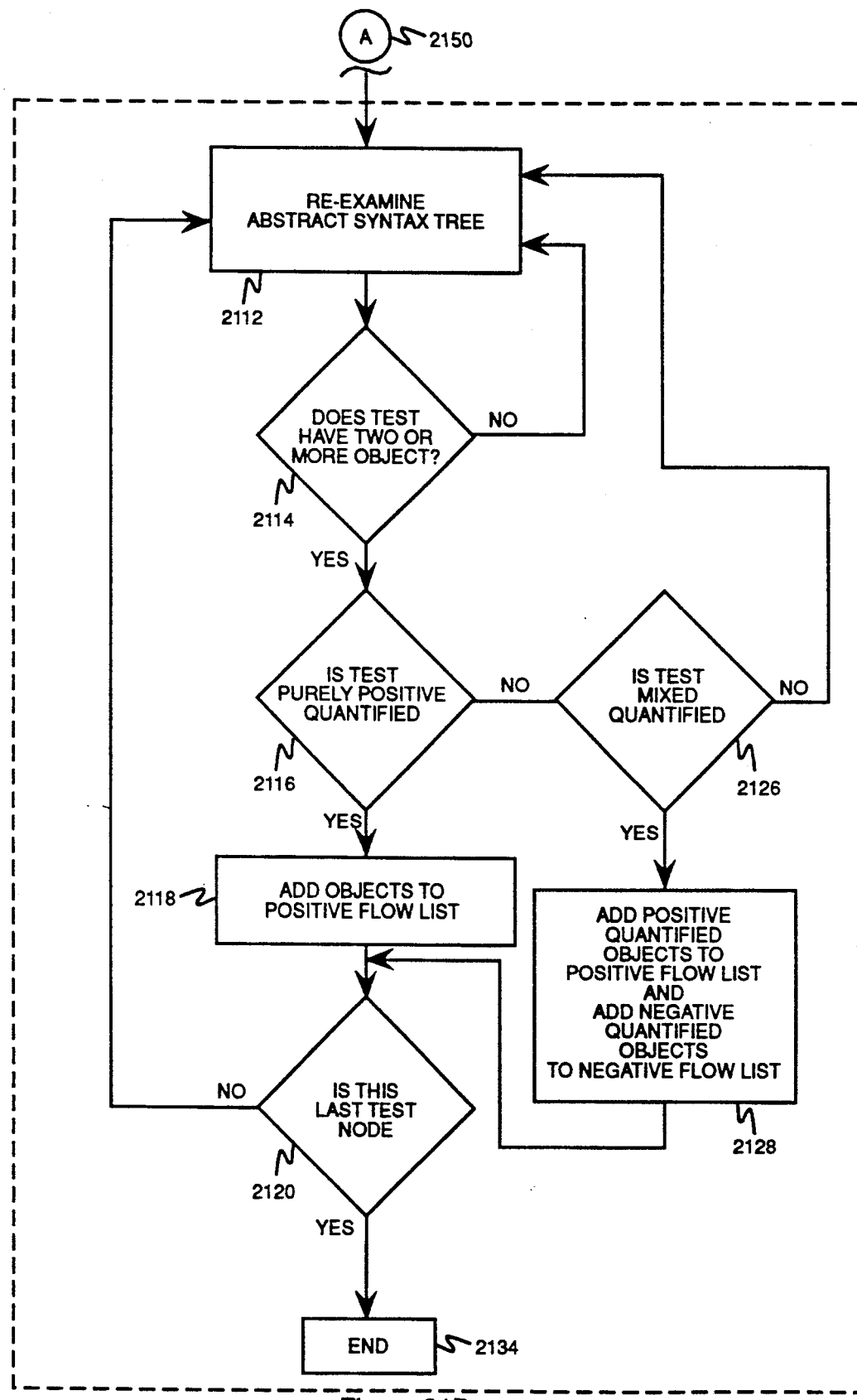

FIGS. 21A-21B are high-level flow charts showing in detail the operation of multi-input flow list module 1802 and its corresponding structural sub-components of FIG. 20: purely negative flow list module 2002, purely positive flow list module 2004, and mixed quantification module 2006. Specifically, FIG. 21A shows the operation of purely negative flow list module 2002, FIG. 21B shows the operation of modules 2004 and 2006.

Referring now to FIG. 21A, as represented by an operational block 2102, purely negative flow list module 2002 first (by looking at the symbol list for each test) instructs CPU 202 to examine the next test in the abstract syntax tree for a given rule. Recall that each test has a symbol list. In the first execution cycle, the next test in the abstract syntax tree will be the first test written by the user. As shown by a decisional block 2104, purely negative flow list module 2002 then instructs CPU 202 to determine whether the test under consideration references two or more different objects. It should be understood that a test that tests whether two attributes of the same object are same would not be considered two different objects.

If only one object is referenced in the test, then control is returned by decisional block 2104 (see NO loop) to operational block 2102, where CPU 202 is instructed to examine the next test in the abstract syntax tree. If, however, two or more different objects exist, control is passed by decisional block 2104 to a decisional block 2106.

As represented by decisional block 2106, purely negative flow list module 2002 then instructs CPU 202 to determine whether the test is purely negatively quantified: whether every object referenced in the test is negatively quantified. If the objects are not all negatively quantified then control returns to operational block 2102 where CPU 202 is instructed to examine the next test in the abstract syntax tree. If, however, every object in the test is negatively quantified, then decisional block 2106 passes control to an operational block 2108.

As represented by operational block 2108, purely negative list module 2002 then instructs CPU 202 to add the objects to the negative flow list. The objects are added in their order of sequence within the test. Thereafter, control passes to decisional block 2110.

As shown by decisional block 2110, purely negative flow list module 2002 is the last test node in the abstract syntax tree. If it is not the last test, control is returned by the NO loop to operational block 2102 when the above cycle resumes. If, however, it is the last test node, control is passed by decisional block 2110 (via 2150) to an operational block 2112 of FIG. 21B.

As represented by operational block 2112, purely positive flow list module 2004 instructs CPU 202 to re-examine the same abstract syntax tree. In this cycle, the next test in the abstract syntax tree will likewise be the first test specified by the user.

As represented by a decisional block 2114, purely positive flow list module 2004 then instructs CPU 202 to determine whether the test under consideration references two or more different objects. If only one object is referenced in the test, then control is returned to operational block 2112, where CPU 202 is instructed to examine the next test in the abstract syntax tree. If, however, two or more different objects exist, control is passed by decisional block 2114 to a decisional block 2116.

As represented by decisional block 2116, purely positive flow list module 2002 then instructs CPU 202 to determine whether the test is purely positively quantified: whether every object referenced in the test is positively quantified. If not all of the objects are positively quantified, then control returns via the NO loop to test 2126, where CPU 202 is instructed to determine whether the test involves mixed quantification. That is, it determines whether some objects referenced in the test are positively quantified while others are negatively quantified. If so, then control passes to operational block 2128.

As shown by operational block 2128, the mixed quantification module 2004 then instructs CPU 202 to add the objects to the negative and positive flowlists. The objects are added in their order of appearance within the test. Thereafter, control passes to decisional block 2120.

If the test does not involve mixed quantification, then control returns via the NO loop to test 2126, where CPU 202 is instructed to examine the next test in the abstract syntax tree. If, however, every object in the test is positively quantified, then control is passed by decisional block 2116 to operational block 2118.

As represented by operational block 2118, purely positive flow list module 2004 then instructs CPU 202 to add the objects to the positive flow list. The objects are added in their order of sequence within the test. Thereafter, control is passed by operational block 2118 to a decisional block 2120.

As shown by decisional block 2120, flow list module 2004 then instructs CPU 202 to determine whether the test under consideration is the last test in the abstract syntax tree. If the test is not the last test in the abstract syntax tree, then control is returned via the NO loop to the operational block 2112. If, however, the test under consideration is the last test in the abstract syntax tree, then control is passed by decisional block 2120 to an operational block 2134 where operation of multi-input flowlist module 1808 is terminated.

It should be noted that the multi-input flowlist module 1802 could well be implemented by processing purely positive, purely negative, and mixed quantification tests separately. That is, multi-input flowlist module 1802 could be implemented in three discrete steps: (1) purely positively quantified tests, (2) purely negatively quantified tests, and (3) mixed quantification tests.

However, in the preferred embodiment, multi-input flowlist module 1802 is processed in two discrete steps: (1) purely negatively quantified tests, and (2) all other multi-input tests. This embodiment safeguards the semantic integrity of the negatively quantified tests more adequately. This embodiment also maximizes the extent to which the user's original ordering of tests can be respected in the final appearance of the Rete network.

Figure 22:
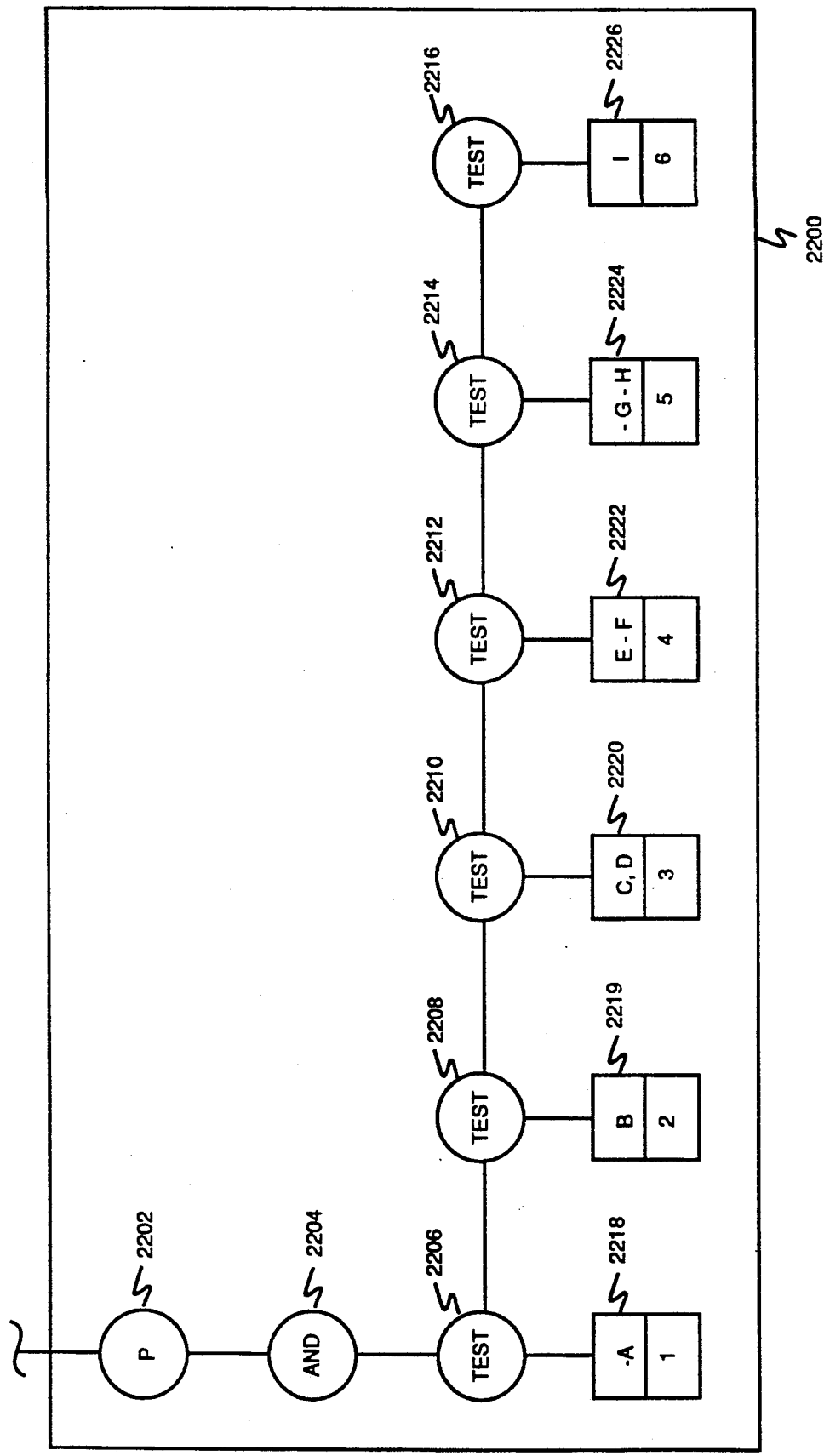
FIG. 22 shows an abstract syntax tree for an example rule.

FIG. 22 shows an abstract syntax tree 2200 for a sample rule (not shown). Shown is a production node 2202 and an AND node 2204. Further shown are test nodes 2206, 2208, 2210, 2212, 2214, and 16. Further shown are symbol lists 2218, 2219, 2220, 2222, 24, and 2226 that correspond, respectively, to each of the above identified test nodes 2206-2216.

Symbol list 2218 indicates that test node 2206 has a test about object A that is negatively quantified. Symbol list 19 indicates that test node 2208 has a test about object B that is positively quantified. Symbol list 2220 indicates that test node 2210 has a test about objects C and D that is purely positively quantified.

Symbol list 2222 indicates that test node 2212 has a test that references on objects E and F. Symbol list 2222 further indicates that object F is a negatively quantified object. Thus, the test denoted by test node 2212 is a mixed quantification test.

Symbol list 2224 indicates that test node 2214 has a test that references objects G and H. Symbol list 2224 further indicates that objects G and H are negatively quantified. Thus, the test denoted by test node 2214 is purely negatively quantified. Symbol list 2226 indicates that test node 2216 has a test about object I that is positively quantified.

It should be noted that no additional information is necessary for the present invention to build the Rete network.

The operation of construction module 606 (FIG. 6) is now explained further by utilizing the construction of the Rete network for the abstract syntax tree (rule) of FIG. 22.

Referring again to FIG. 22, and as stated previously, the first operation of construction module 606 is that of operation of multi-input flow list module 1802 (FIG. 18). The operation of multi-input flow list module 1802 has been described in detail with respect to FIGS. 21A-21B. The second operation of construction module 606 is that of alpha node module 1804. The third operation is that of dangling alpha module 1806. The final operation of construction module 606 is that of multi-input node module 1808. Each of these submodules 1802, 1804, 1806 and 1808 of construction module 606 are now explained in the context of building a Rete network for the abstract syntax tree of FIG. 22.

Figure 23:
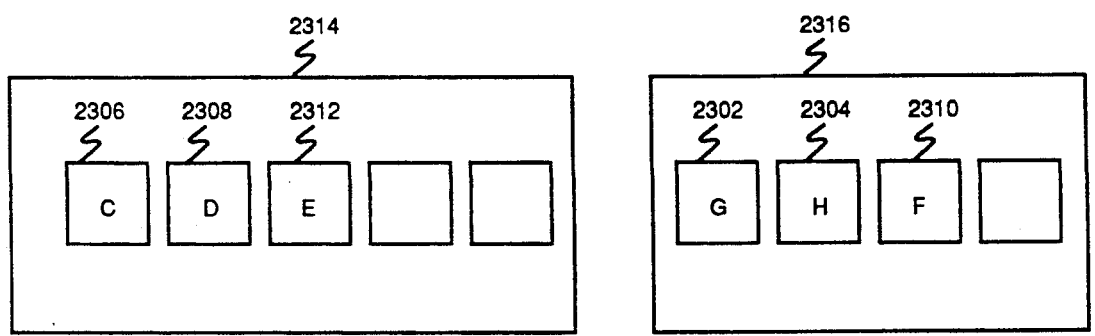
FIG. 23 shows the contents of the flowlist built by multi-input tree flowlist module 1802 for the example of FIG. 22.

FIG. 23 shows in block diagram format a positive flow list block 2314 and a negative flow list block 2316. Positive flow list block 2314 and negative flow list block 2316 are memory locations within memory device 204 (FIG. 2).

As described in connection with FIG. 21A, purely negative flow list module 2102 of multi-input flow list module 1802 builds flow list entries for purely negative objects first. In the rule shown in FIG. 22, objects G and H of symbol list 2224 represent purely negatively quantified objects that are part of a multi-input test. Objects G and H of symbol list 2224 are thus inserted into negative flow list block 2316 as flow list entries 2302 and 2304, respectively. No other purely negative two input objects exist.

As described in connection with FIG. 21B, purely positive flowlist module 2008 thereafter instructs CPU 202 to examine all multi-input tests of FIG. 22. Purely positive flow list module 2004 adds objects from purely positive test to positive flow list block 2314. As shown in FIG. 22, objects C and D of symbol list 2210 are purely positive two input objects and are thus inserted as flow list entries 2306 and 2308 respectively in positive flow list block 2314. No other purely positive two input objects exist in the symbol list of FIG. 22.

As also described in connection with FIG. 21B, mixed quantification module 2006 instructs CPU 202 to add the negative objects of the mixed quantification tests to negative flow list block 2316. Object F of symbol list 2222 is the only negative object of a mixed quantification test, and thus is inserted as flow list entry point 2310 in negative flow list block 2316. No other negative mixed quantification objects exist.

Thereafter, mixed quantification module 2006 adds the positive objects of mixed quantification tests to positive flow list block 2314. As shown in FIG. 22, object E of symbol list 2222 is the only positive variable that corresponds to a mixed quantification test. Object E of symbol list 2222 is inserted as flow list entry 2312 in positive flow list block 2314. The operation of multi-input flow list module 1802 alone insures a relatively tight and optimized Rete network. It should be appreciated that the order of multi-input tests (or beta tests) entered by the user dictates the relative appearance of the Rete network. The present invention therefore respects the users ordering with respect to multi-input tests.

Figure 24:
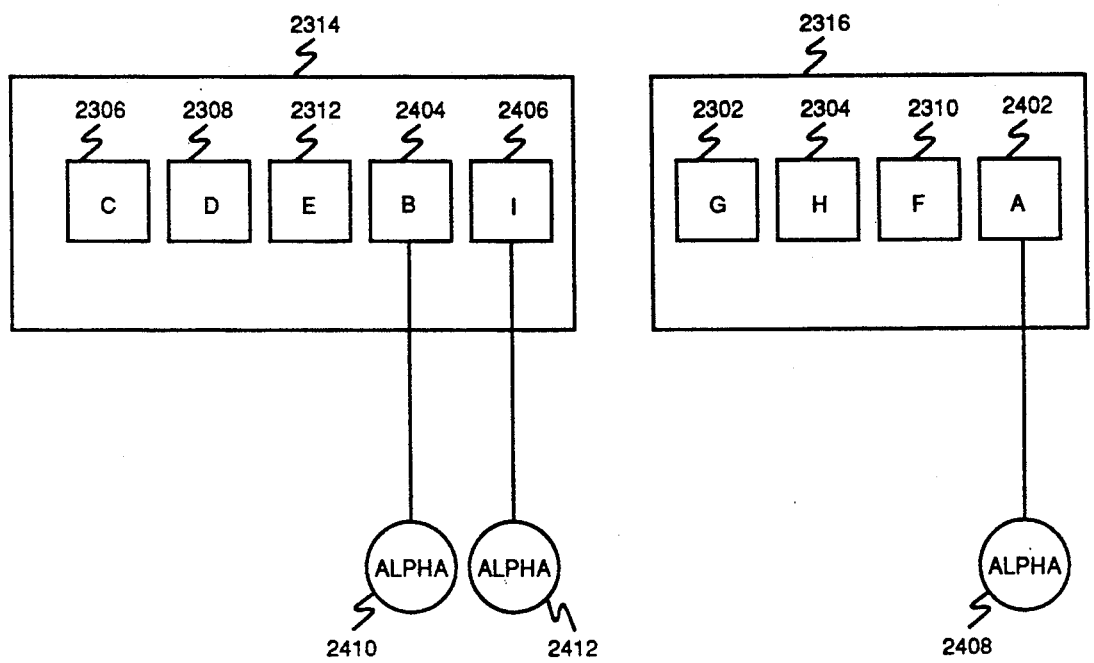
FIG. 24 shows contents of the flowlist built by alpha node module 1804 for the example of FIG. 22.

The operation of Alpha node module 1804 is now described in the context of modifying the positive flow list block 2314 and negative flow list block 2316. FIG. 24 -shows the modification of positive flow list block 2314 and..negative flow list block 2316 of FIG. 23.

Referring to FIG. 24, Alpha node module 1804 operates similar to multi-input flow list module 1802. Similar to multi-input flow list module 1802, alpha node module 1804 instructs CPU 202 to examine the abstract syntax tree of FIG. 22 and to look at the test nodes.

Alpha node module 1804, however, looks for objects used in single input tests as opposed to multi-input tests. In other words, alpha node module 1804 finds test nodes with one object. These test nodes eventually become alpha tests.

The flow list entries for these one input tests are added to positive flow list block 2314 and/or negative flow list block 2316 if they have not already been built by multi-input flow list module 1802 (note that the same object can be in both a one and two input test; an Alpha test for that object is termed a non-dangling alpha test in the present invention because it is also part of a two input test). Accordingly, Alpha node module 1804 examines the symbols list of FIG. 22 and builds flow list entries in the order it finds a one input object without regard to whether it is negatively quantified.

In contrast to multi-input flow list module 1802, alpha node module 1804 instructs CPU 202 to immediately build a Rete alpha node when it enters the one input object into the flow list. This is the first Rete node actually built by the present invention.

If the same object has multiple one input tests, then multiple alpha nodes are connected one below the other. Alpha nodes are built first because it would be inefficient to connect the beta node before connection of any associated alpha nodes.

As represented in FIG. 24, alpha node module 1804 has "updated" positive flow list block 2314 and negative flow list block 2316. As shown, negatively quantified object A of symbol list 2218 of FIG. 2 has been added as a flow list entry point 2402 in negative flow list block 2316. Likewise, objects B and I of symbol lists 2208 and 2216, respectively, have been added as flow list entry points 2404 and 2406 in positive flow list block 2314. As further shown in FIG. 24, Alpha node module 1804 has also built alpha nodes 2408, 2410, and 2412, respectively.

The above nodes are the first nodes built into the Rete network. It should be appreciated that the present invention builds the Rete network "off" of positive flow list block 2314 and negative flow list block 2316. This data structure provides a convenient way to build the Rete network.

At this point, multi-input flow list module 1802 and alpha node module 1804 of the present invention have identified every object used in a given rule. Moreover, multi-input flow list module 1802 and alpha node module 1804 have entered these objects as flow list entry points into either a Positive or negative flow list.

The operation of dangling alpha module 1806 of FIG. 18 is now discussed in the context of its modification of positive flow list 2314 and negative flow list 2316 of FIG. 24.

In general, dangling alpha module 1806 instructs CPU 202 to rearrange positive flow list block 2314 so that dangling alpha nodes are placed in the order in which they were created by the user. A dangling alpha test is an intra-element test about an object which is not used by any inter-element test. In other words, it is a single test about an object where that object is not also referenced in a multi-input test. The present invention has also designated a dangling alpha test as a means specified by the user to gate all subsequent tests. In other words, the present invention allows the user to selectively enable/disable subsections of the Rete-network solely by the placement of dangling alpha tests. Dangling alpha test are given priority, wherever possible.

Figure 25:
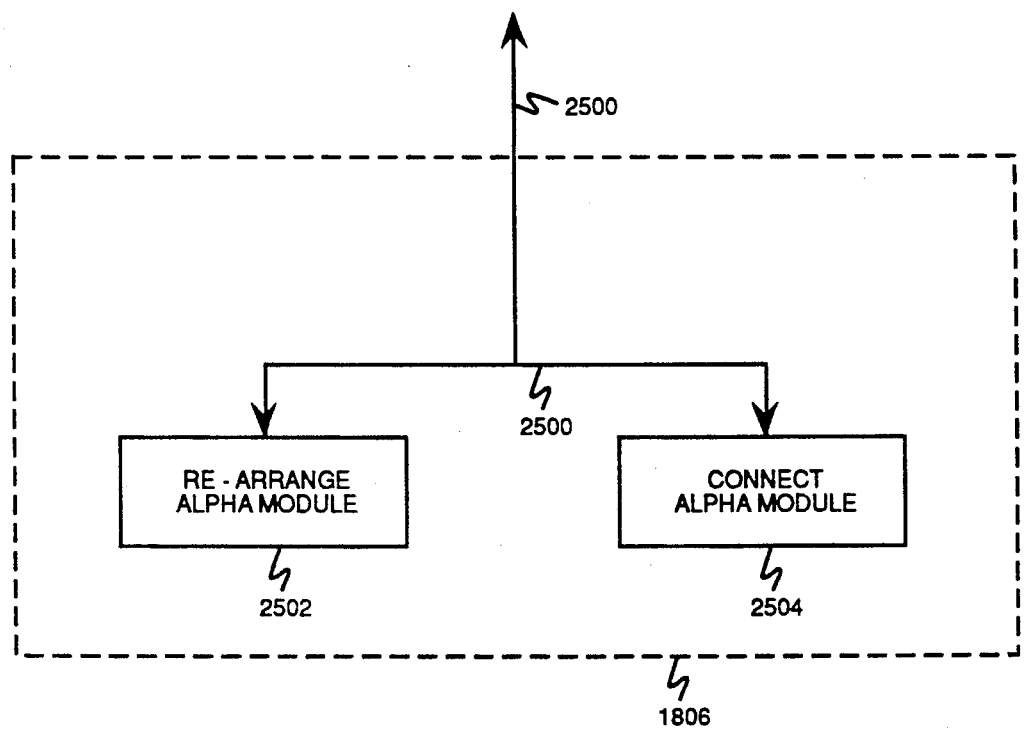
FIG. 25 shows the architecture of alpha reordering routine 1806.

As represented in FIG. 25, dangling alpha module 1806 comprises a rearranged alpha module 2502 and a connect alpha module 2504. Rearrange alpha module 2502 modifies the positive flow list 2314 so that dangling alpha tests are replaced to where the user originally placed them. It should be noted, however, that rearrange alpha module 2502 only modifies entries of positive flow list 2314. In other words, rearrange alpha module 2502 does not modify negative flow list entries. The reason for this is to preserve the semantic meaning of negatively quantified tests.

Figure 26:
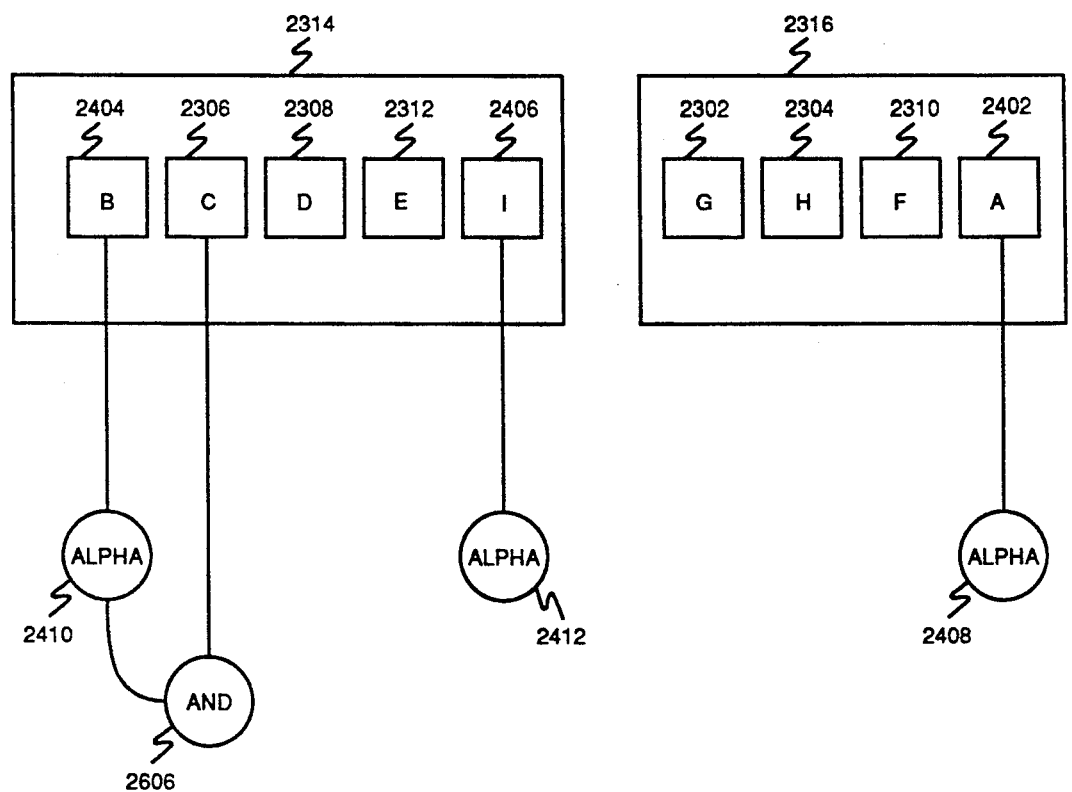
(FIGS. 26 through 33 illustrate the sequence of Rete network construction for the example abstract syntax tree in FIG. 22.)

As represented in FIG. 26, operation of rearrange alpha module 2502 has modified positive flow list block 2314 of FIG. 24. As can be seen from FIG. 26, object B of symbol list 2219 has been moved from flow list entry point 2404 to 2602. Object I of symbol list 2226 is not relocated because its test location (number 6) indicates that it is already in its proper location.

Rearrange alpha module 2502 performs the above reorganization using a algorithm which is now described. In the algorithm, rearranged alpha module 2502 references the number associated with each flow list entry. Recall that the first time through the abstract syntax tree, the parser 302 stores the objects location within the overall rule. Rearrange alpha module 2502 iterates over the flow list starting from the left and comparing the dangling alpha node with each flow list entry test number. When the iteration determining that the dangling alpha node number is greater than one on the left and less than one on the right, CPU 202 knows to insert that dangling alpha into that location. It then bumps up the location of all subsequent variables.

Connect alpha module 2504 of FIG. 25 is now discussed. Connect alpha module 2504 instructs CPU 202 to connect a dangling alpha with the adjacent flow list entry point. This operation is also represented in FIG. 26. As shown, dangling alpha node 2410 has been connected with flow list entry point 2306 by an AND node 2606. This is performed so that the dangling alpha node 2410 is connected to the remainder of the Rete network. It should be noted that flow list entry 2406 (object I) and its associated alpha node 2410 has not been connected with an AND node. The reason for this is that flow list entry 2406 is the farthest right entry in the positive flow list module 2314. Although not illustrated, it should be understood that two adjacent dangling alpha nodes will be connected with each other and then connected with the next right adjacent flow list entry.

Dangling alpha module 1806 is a significant feature of the present invention that allows the power user to maintain control over the topology of the Rete network.

In general, the Beta nodes and the Beta-Not nodes control the topology of the Rete network. The reason for building the flow list for multi-input objects first and then reinserting dangling alphas therein, is because non-dangling alpha tests can be present in a given rule. Non-dangling alphas are driven by the Beta nodes because they are required as an input to an associated two input test. As discussed earlier, the present invention clusters all the beta referenced objects together so as to get a tight Rete network. However, to counter this feature, the present invention honors the user's sequence of dangling alpha tests.

Multi-input node module 1808 of construction module 606 is now discussed in detail. As previously discussed, operation of multi-input node module 1808 represents the final operation in building the Rete network. The operation of multi-input node module 1808 comprises two steps.

The first step, as previously shown in operational block 1914 of FIG. 19, is that of examining, in sequence, the symbol lists, and to locate only purely negative Beta tests (tests involving two or more objects). If a purely negative beta test is located, then a beta test is build for the tested objects on the negative flow list.

The second step, as previously shown in operational block 1914 of FIG. 19, is that of re-examining every test, in sequence, in the symbol lists (in contrast with the first step, where only purely negative two input tests were of interest). Depending upon whether the given test in the symbol list is positively quantified, negatively quantified, or mixed quantified, certain actions are performed.

Generally, if the test under examination is a positively quantified multi-input test, then a BETA test is built. If the test under examination is a mixed quantification test, then a BETA_NOT test is built. If the test under consideration is a purely negative test (that is, an alpha or beta node which is hanging off of the negflow flowlist), then the purely negative test is connected to the positive side of the Rete network with an AND_NOT node.

The above operation of multi-input node module 1808 is better understood with reference to the continuation of building the rete network for the rule shown in FIG. 22. Recall that in FIG. 26, dangling alpha module 1806 reorganized the dangling alphas tests to their original location as specified by the user (test on object B) and connected the same to the rete network with an and node (and node 2606).

Figure 27:
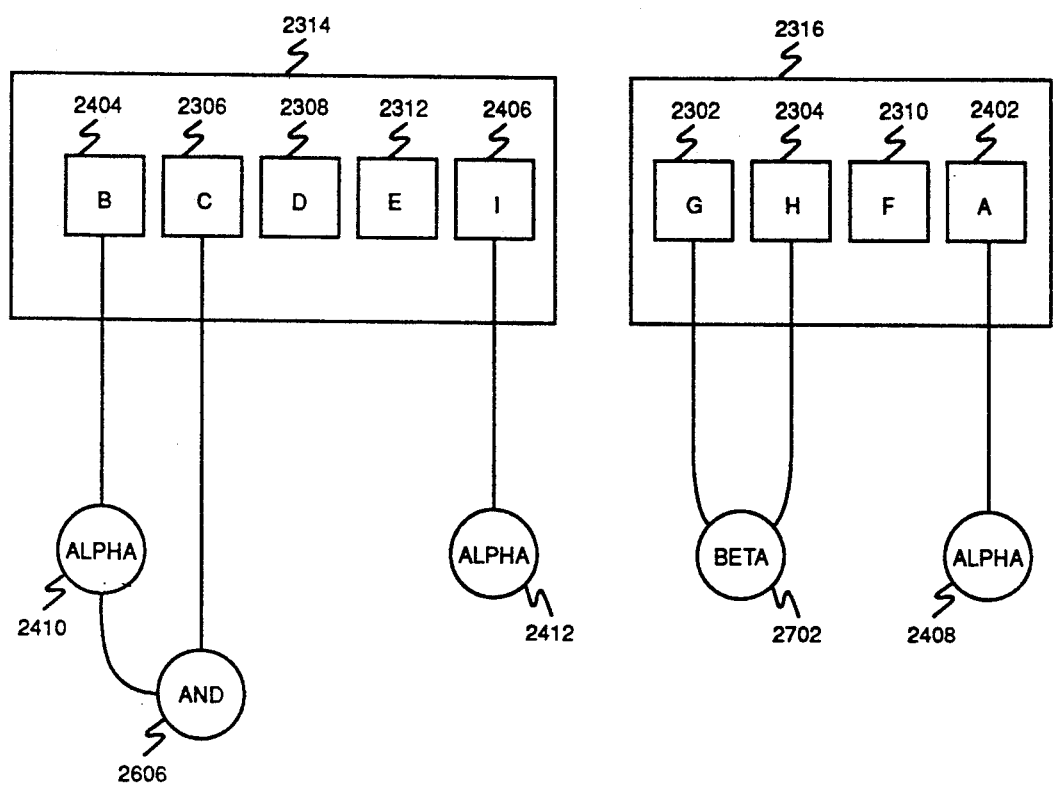

As discussed above, the first step in the operation of multi-input node module 1808 is that of building beta test for purely negative two input tests (a test against two or more objects). In operation, multi-input node module 1808 instructs CPU 202 to examine the symbol lists of FIG. 22 and locate all purely negative two input tests. In the example shown in FIG. 22, CPU 202 determines that only one such test exists: test 2214 that references objects G and H. As can be seen from FIG. 27, multi-input node module 1808 then instructs CPU 202 to connect-objects G and H via a beta test node 2702. No other purely negative two input tests exist. Thus, the state of the Rete network after the above operation is as shown in FIG. 27.

The second step of multi-input node module 1808 will now be described with reference to the building of the Rete network for the rule of FIG. 22. As discussed above, multi-input node module 1808 instructs CPU 202 to re-examine each test and depending upon the type of test, perform some action on that test.

Figure 28:
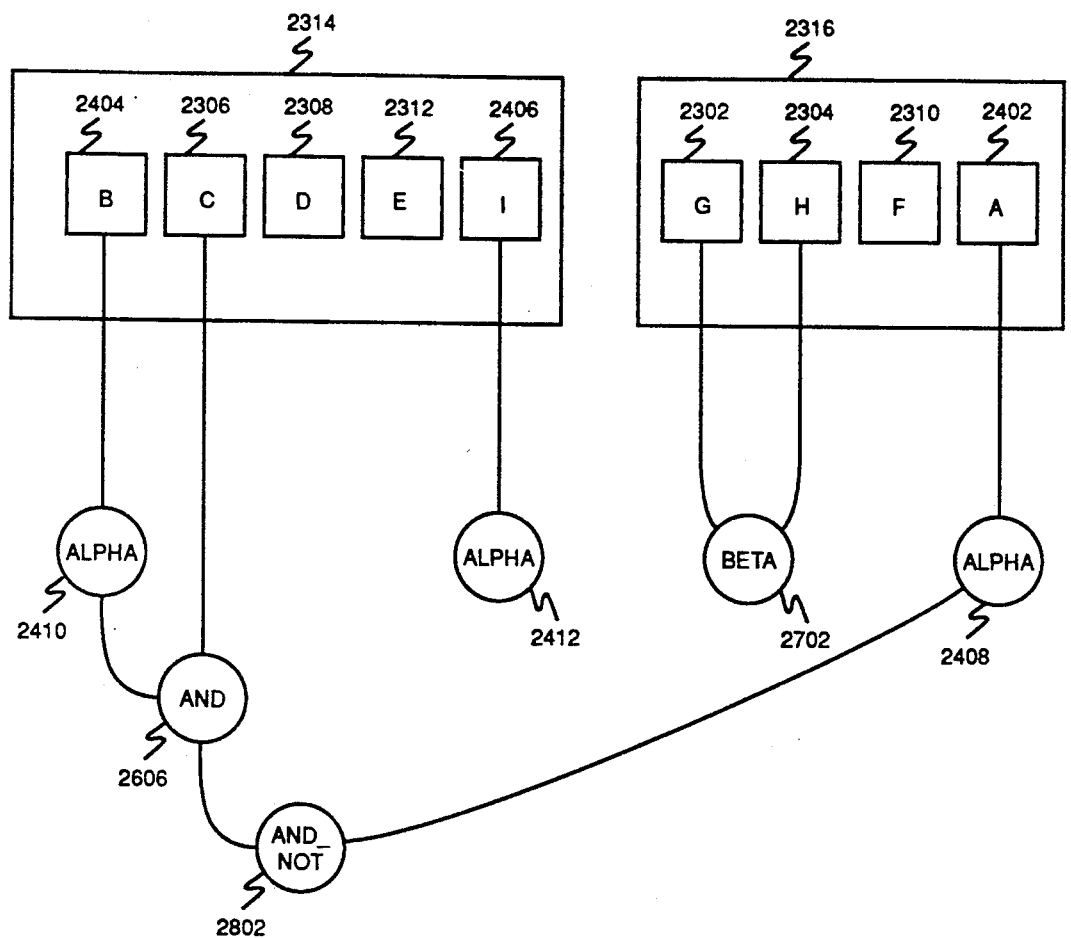

In our example, examination of the symbol lists of FIG. 22 in sequence indicates that test 2206 (test against object A) is the first test under examination. Test 2206 is a purely negative test against object A. As shown in FIG. 28, in response to this type of test, multi-input node module 1808 instructs CPU 202 to connect object A (which is located in the negative flow list) to positive flow list 2314 with an and_not node 2802.

After completing the action of the first test in the rule (test 2206) multi-input node module 1808 instructs CPU to examine the next test in the rule. The next test in the rule of FIG. 22 is that of test 2208 (a test against object B). Examination of test 2208 indicates that test 2208 is a purely positive one input test against object B. In this situation, multi-input node module 1808 would normally instruct CPU 202 to connect object B via an and node (recall that all alpha nodes were previously built by alpha node module 1804) to the Rete network. In this example, however, the alpha test for object 2219 was already connected to the Rete network via node 2606. Therefore, no action needs to be performed for test 2208.

Figure 29:
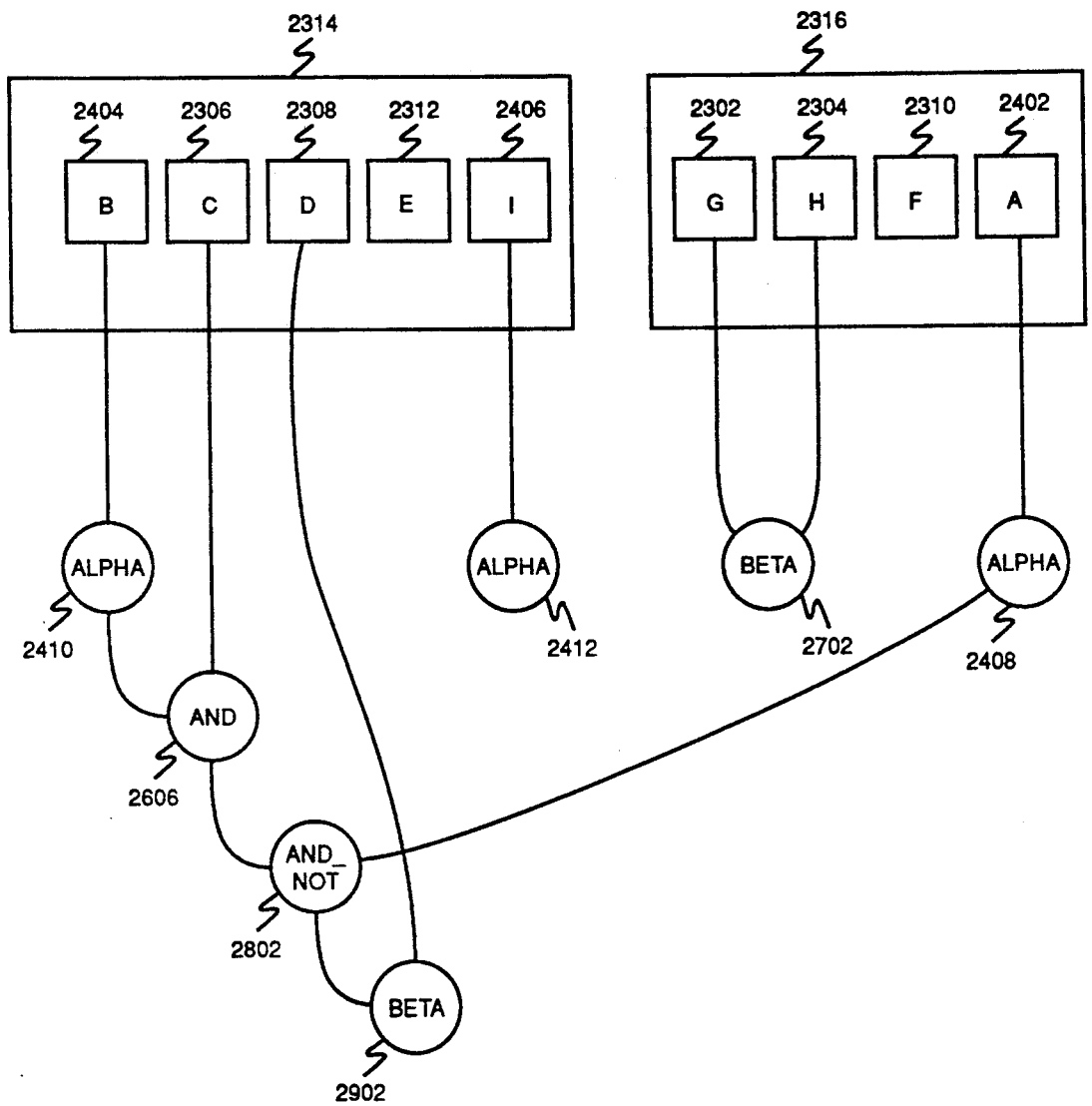

Thereafter, multi-input node module 1808 once again instructs CPU 202 to examine the next test in the rule of FIG. 22. The next test in the rule of FIG. 22 is that of test 2210 (a test against object C and D). Examination of test 2210 indicates that test 2210 is a purely positive two input test against objects C and D. As shown in FIG. 29, in response to this type of test, multi-input node module 1808 instructs CPU 202 to connect objects C and D via a beta test node 2902.

Thereafter, multi-input node module 1808 once again instructs CPU 202 to examine the next test in the rule of FIG. 22. The next test in the rule of FIG. 22 is that of test 2212 (a test against objects E and F). Examination of test 2212 indicates that test 2212 is a mixed quantification test, wherein object E is positively quantified and object F is negatively quantified.

Figure 30:
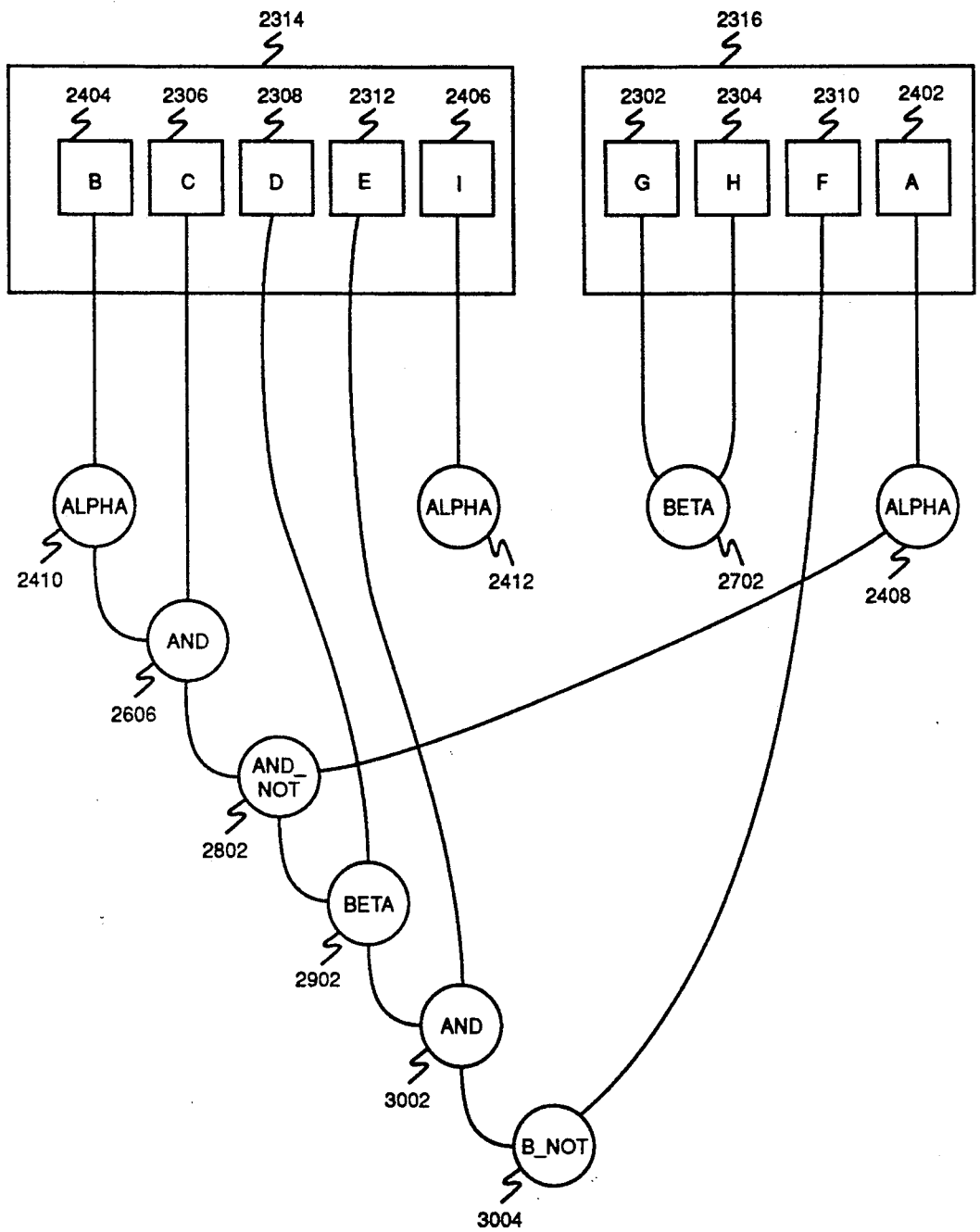
Figure 31:
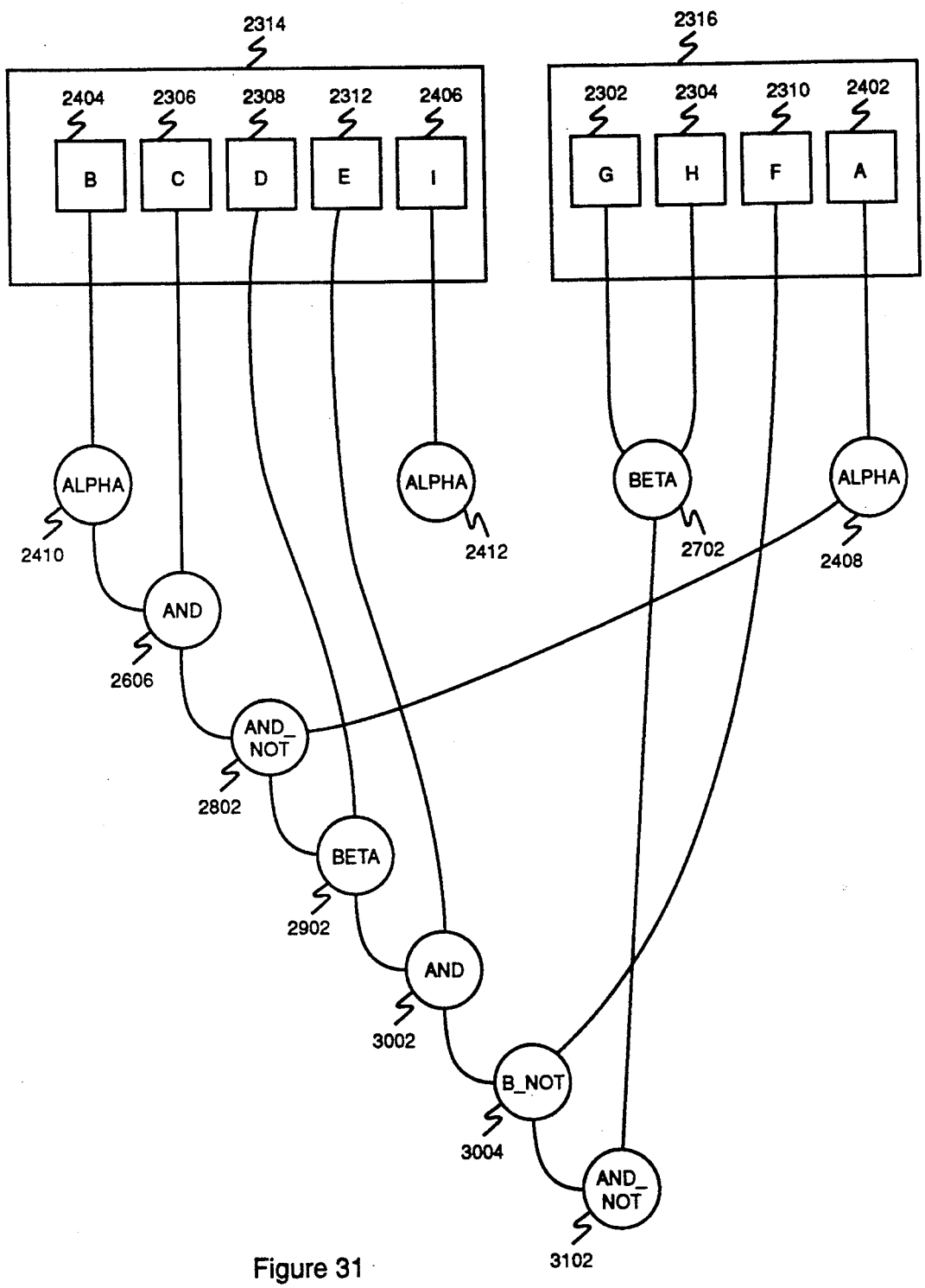
Figure 32:
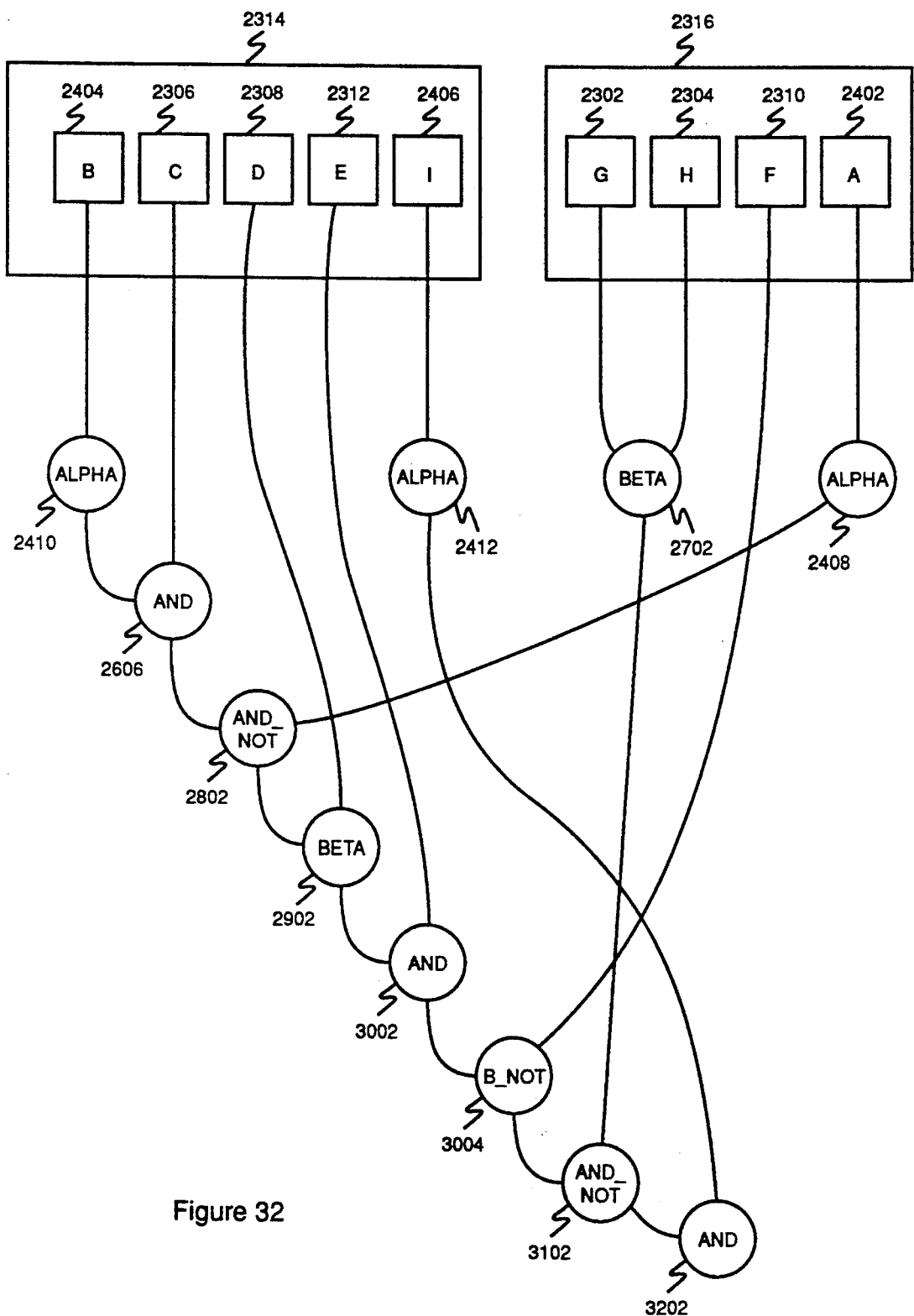
Figure 33:
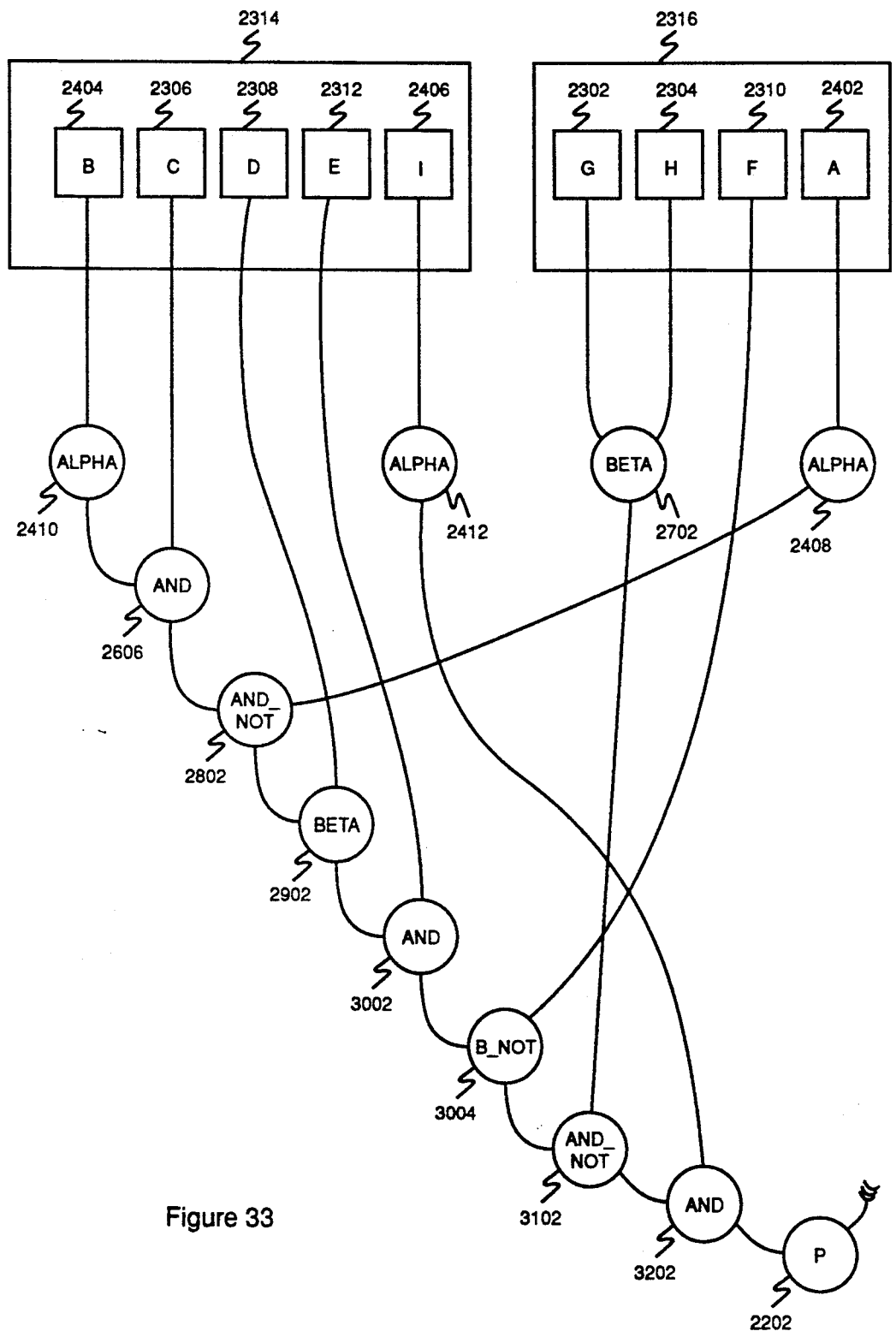

As represented in FIG. 30, in response to this type of test, multi-input node module 1808 instructs. CPU 202 to connect objects E and F with a beta_not node 3004. It should be noted, however, that in the rule of FIG. 22, object E must first be connected with the Rete network. Therefore, in this type of circumstance, multi-input node module 1808 first instructs CPU 202 to connect object E to the Rete network with an AND node 3002. In general, multi-input node module 1808 first determines if the left most object in the flow list is connected to the Rete network before actually constructing the test under consideration.

Thereafter, multi-input node module 1808 once again instructs CPU 202 to examine the next test in the rule of FIG. 22. The next test in the rule of FIG. 22 is that of test 2214 (a test against objects G and H). Examination of test 2214 indicates that test 2214 is a purely negatively quantified two input test. As shown in FIG. 30, in response to this type of test, multi-input node module 1808 instructs CPU 202 to connect beta test-node 2702 to Rete network via an AND_not node 3102. Recall, that the beta test for objects G and H was the first test built by the first operation of multi-input node module 1808. In the second operation of multi-input node module 1808 only instructs CPU 202 to connect beta test 2702 to rest of the Rete network.

Thereafter, multi-input node module 1808 once again instructs CPU 202 to examine the next test in the rule. The next test in the rule of FIG. 22 is that of test 2216 (a positively quantified test against object I). Test 2216 is also that last test in the rule of FIG. 22. Examination of test 2216 indicates that test 2214 is a purely positive one input test against object 1. In this situation, multi-input node module 1808 instructs CPU 202 to connect object B via an AND node 3202 (recall that alpha node 2410 was previously built by alpha node module 1804) to the Rete network.

Thereafter, multi-input node module 1808 once again instructs CPU 202 to examine the next test in the rule of FIG. 22. This, time, however, CPU 202 instructs multi-input node module 1808 that no additional test exist in the rule. In response, multi-input node module 1808 instructs CPU 202 to connect AND node 3202 to production node 2202.

It should be noticed that production node 2202 is that of production node 2202 of FIG. 22. In other words, the Rete network "hangs off" production node 2202. Moreover, as discussed previously, production node 2202 is the central location for all information concerning the rule of FIG. 22. This type of data structure is a convenient way to organize and build the Rete network for a given rule.

Implicit condition module 608 is now discussed. Implicit condition module 608 operates on the rule set to insure that all implicit conditions of the RHS of a rule actually exist in the knowledge base. Implicit condition module 608 does not allow things to fall into the conflicts set that are moot points.

Figure 34:
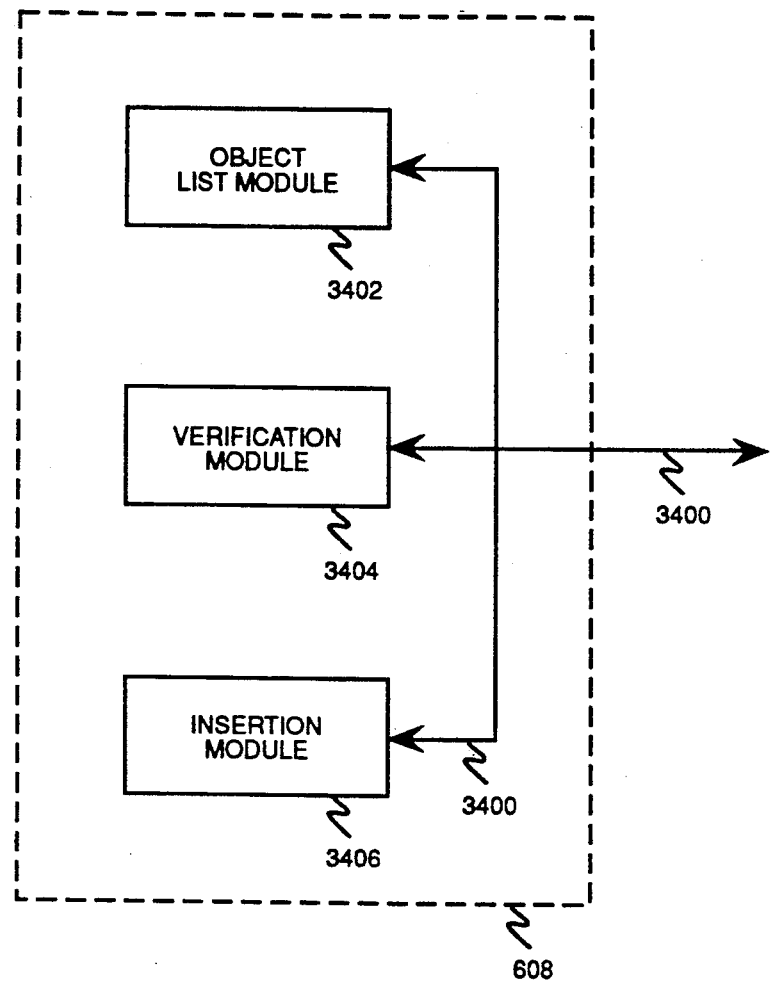
FIG. 34 shows an architectural diagram of the Rete network implicit condition module 608.

As represented in FIG. 34, implicit condition module 608 comprises an object list module 3402, a verification module 3404, and an insertion module 3406.

Object list module 3402 instructs CPU 202 to generate a list of all the unique objects contained in the RHS of a rule. This list is used as reference point in memory for the computer system to check if all implicit conditions are defined.

Verification module 3404 instructs CPU 202 to first iterate over the object list and determine whether the objects are present on the LHS of the rule. If an object is not on the LHS of the rule, verification module 3404 then instructs CPU 202 to determine whether the presence of the object on the RHS is due to a new creation of the object. A new creation of an object means that it cannot be an implicit condition of the LHS of the rule.

If an implicit condition is found, insertion module 3406 is then executed and instructs CPU 202 to insert the object into the Rete network for the rule. Insertion module 3406 therefore adds the implicit condition to the LHS of the rule.

The discussion thus far in the detailed description of the present invention has related to the processing and building of a Rete network for a given rule (including adding any implicit conditions to the Rete network for each rule). If multiple rules existed, then multiple individual Rete network have been constructed.

As discussed in the Background Section, one significant feature of Rete networks is that of sharing common test nodes between rules. This feature is sometimes referred to as an optimized Rete network. In conventional Rete network building systems, the optimization step is an integrated step when constructing the Rete network. In . other words, the optimization occurs as the rules are being constructed. In conventional Rete building systems, a Rete network is first built for one rule. Thereafter, as the Rete network for the next rule is being built, the compiler will not build a test that was already previously built. This is where the optimization is built into the actual Rete network construction.

In contrast, each rule of the present invention is built with its own separate Rete network. Therefore, optimization in the present invention occurs as a separate step and as a result redundant tests may have been built. As is discussed herein, it is not necessary that optimization occur after separate Rete networks are built for each rule. The present invention contemplates that optimization could be integrated with construction module 606.

Optimization module 610 of the present invention will now be discussed.

In conventional Rete network systems, a give- Rete test node might serve as the immediate ancestor (that is, left or right input) of multiple Rete nodes. Thus, an identical. condition appearing multiple times within a rule or across several rules might only be represented once within the Rete network. This multiple reuse of Rete nodes is referred to as optimization. Optimization can greatly improve processing speed and memory utilization.

In the current embodiment, Rete networks may be built with or without optimization: The advantage of building Rete network without optimization is that the resultant Rete networks are easier to debug and understand. This enables the user to first build and debug rules and then later "tune" the Rete network for better performance.

In this embodiment, optimization is accomplished by examining each root node. This is done to find all Rete network test nodes which involve a given type of data object. This process identifies all candidate Rete nodes for possible consolidation.

This consolidation takes two forms:
1. combining tests,
2. sharing inputs.

Tests are combined as follows:
1. Make variable names common:
   All tests which involve variables pertaining to a given type of data object are altered such that the related variables have common names.
2. Combine intra-element tests:
   Successive alpha nodes are "collapsed" into one alpha node with a compound test (for example, 2 alpha tests, x.color='Blue' and x.wheel=4, become 1 alpha test which tests both color and wheel).

3. Combine inter-element tests:

Successive multi-input test nodes such as-.beta nodes are "collapsed" into one test node with a compound test. This process is very similar to that applied to the alpha tests.

Inputs are shared as follows:

1. Identical Rete test nodes are identified
2. For each set of identical test nodes found, one node is kept and the others are deleted. Linkages in the Rete network are altered so that nodes which had ben connected to the deleted nodes are now connected to the remaining node.

The foregoing description is intended primarily for purposes of illustration. This invention may be embodied in other forms or carried out in other ways without departing from the spirit or scope of the invention. Modifications and variations still falling within the spirit or the scope of the invention will be readily apparent to those of skill in the art.

We claim:

1. A computer-method for organizing a set of inputted rules into an efficient RETE network, each rule having at least one test condition, wherein the test condition or test conditions can be arbitrarily specified in conjunctive, negated, and/or disjunctive form, which computer-method comprises the steps of:
   (a) building a data structure for each rule and storing the data structure in a storage device;
   (b) transforming the data structure into at least one other modified data structure that is in conjunctive form;
   (c) building a flow list for the unique objects of the data structure; and
   (d) building at least one test node on the flow list for each of the unique objects.

2. The computer-method of claim 1, wherein the step of building a data structure for each rule comprises the step of storing information about each test condition of the rule, wherein the stored information includes all the unique objects for a given test.

3. The computer-method of claim 2, wherein said step of storing information about each test condition comprises the step of generating a symbol list for each test condition.

4. The computer-method of claim 1, wherein said transformation step comprises the steps of:
   (a) examining the data structure for each rule and removing negation from the rule; and
   (b) examining the data structure for each rule and removing disjunctions from the rule.

5. The computer-method of claim 4, wherein said step of removing disjunctions comprises the step of building an additional rule.

6. The computer-method of claim 1, wherein said step of building a flow list comprises the steps of building a positive flow list and a negative flow list.

7. The computer-method of claim 6, wherein said step of building a flow list further comprises the steps of:
   (a) adding objects to the negative flow list which are involved in a purely negative multi-input test;
   (b) adding objects to the positive flow list which are involved in a purely positive multi-input test;
   (c) adding objects to the positive or negative flow list which are involved in a mixed quantification multi-input test; and
   (d) adding objects to the positive or negative flow list which are only specified in alpha tests.

8. The computer-method of claim 1, wherein the step of building at least one test node on the flow list for each of the unique objects comprises the steps of:
   (a) examining each test condition of the rule;
   (b) building beta nodes for purely negatively quantified test conditions first; and
   (c) building beta nodes or beta_not nodes depending on whether test condition is purely positive or mixed quantification, and connecting purely negative beta nodes to the flow list with an and_not node.

9. The computer-method of claim 1 further comprising the step of adding implicit conditions to the rules.

10. The computer-method of claim 9, wherein said step of adding implicit conditions comprises the steps of:
    (a) examining the right hand side of the rule to determine an unique list of objects;
    (b) examining the left hand side of the rule to determine which objects on the right hand side are not present on the left hand side of the rule;
    (c) determining whether the objects not present on the left hand side of the rule are created by the firing of the rule; and
    (d) adding the objects to the left hand side of the rule if the objects are not created by the firing of the rule.

* * * * *